United States Patent
Wetherbee et al.

(10) Patent No.: US 11,460,500 B2
(45) Date of Patent: Oct. 4, 2022

(54) COUNTERFEIT DEVICE DETECTION USING EMI FINGERPRINTS

(71) Applicant: ORACLE INTERNATIONAL CORPORATION, Redwood Shores, CA (US)

(72) Inventors: Edward R. Wetherbee, Omaha, NE (US); Guang C. Wang, San Diego, CA (US); Kenny C. Gross, Escondido, CA (US); Michael Dayringer, Sunnyvale, CA (US); Andrew Lewis, Litchfield, NH (US); Matthew T. Gerdes, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 326 days.

(21) Appl. No.: 16/784,506

(22) Filed: Feb. 7, 2020

(65) Prior Publication Data
US 2021/0247442 A1 Aug. 12, 2021

(51) Int. Cl.
*G01R 31/28* (2006.01)
*G01R 31/302* (2006.01)
(Continued)

(52) U.S. Cl.
CPC ....... *G01R 31/2884* (2013.01); *G01R 31/002* (2013.01); *G01R 31/302* (2013.01);
(Continued)

(58) Field of Classification Search
CPC .............. G01R 1/0466; G01R 19/0084; G01R 31/2648
See application file for complete search history.

(56) References Cited

U.S. PATENT DOCUMENTS

| 7,020,802 B2 | 3/2006 | Gross et al. |
| 7,281,112 B1 | 10/2007 | Gross et al. |

(Continued)

FOREIGN PATENT DOCUMENTS

| CN | 107 181 543 A | 9/2017 |
| CN | 107181543 | 9/2017 |
| CN | 110 941 020 A | 3/2020 |

OTHER PUBLICATIONS

Whisnant et al; "Proactive Fault Monitoring in Enterprise Servers", 2005 IEEE International Multiconference in Computer Science & Computer Engineering, Las Vegas, NV, Jun. 27-30, 2005.
(Continued)

*Primary Examiner* — Tung X Nguyen
(74) *Attorney, Agent, or Firm* — Kraguljac Law Group, LLC

(57) ABSTRACT

Detecting whether a target device that includes multiple electronic components is genuine or suspected counterfeit by: performing a test sequence of energizing and de-energizing the target device and collecting electromagnetic interference (EMI) signals emitted by the target device; generating a target EMI fingerprint from the EMI signals collected; retrieving a plurality of reference EMI fingerprints from a database library, each of which corresponds to a different configuration of electronic components of a genuine device of the same make and model as the target device; iteratively comparing the target EMI fingerprint to the retrieved reference EMI fingerprints and generating a similarity metric between each compared set; and indicating that the target device (i) is genuine where the similarity metric for any individual reference EMI fingerprint satisfies a threshold test, and is a suspect counterfeit device where no similarity metric for any individual reference EMI fingerprint satisfies the test.

20 Claims, 14 Drawing Sheets

(51) Int. Cl.
    *G06F 21/55*     (2013.01)
    *G06K 9/62*     (2022.01)
    *G01R 31/00*     (2006.01)
    *G06K 9/00*     (2022.01)

(52) U.S. Cl.
    CPC ....... *G06F 21/552* (2013.01); *G06K 9/00557* (2013.01); *G06K 9/6277* (2013.01)

(56) References Cited

U.S. PATENT DOCUMENTS

| | | | |
|---|---|---|---|
| 7,613,576 | B2 | 11/2009 | Gross et al. |
| 7,613,580 | B2 | 11/2009 | Gross et al. |
| 7,702,485 | B2 | 4/2010 | Gross et al. |
| 7,869,977 | B2 | 1/2011 | Lewis et al. |
| 8,055,594 | B2 | 11/2011 | Dhanekula et al. |
| 8,069,490 | B2 | 11/2011 | Gross et al. |
| 8,200,991 | B2 | 6/2012 | Vaidyanathan et al. |
| 8,275,738 | B2 | 9/2012 | Gross et al. |
| 8,341,759 | B2 | 12/2012 | Gross et al. |
| 8,457,913 | B2 | 6/2013 | Zwinger et al. |
| 8,543,346 | B2 | 9/2013 | Gross et al. |
| 10,149,169 | B1 | 12/2018 | Keller |
| 10,452,510 | B2 | 10/2019 | Gross et al. |
| 10,496,084 | B2 | 12/2019 | Li et al. |
| 2008/0252309 | A1 | 10/2008 | Gross et al. |
| 2008/0256398 | A1 | 10/2008 | Gross et al. |
| 2009/0099830 | A1 | 4/2009 | Gross et al. |
| 2009/0125467 | A1 | 5/2009 | Dhanekula et al. |
| 2009/0306920 | A1 | 12/2009 | Zwinger et al. |
| 2010/0023282 | A1 | 1/2010 | Lewis et al. |
| 2010/0033386 | A1* | 2/2010 | Lewis ................... G01R 31/001 702/57 |
| 2010/0305892 | A1 | 12/2010 | Gross et al. |
| 2010/0306165 | A1 | 12/2010 | Gross et al. |
| 2012/0030775 | A1 | 2/2012 | Gross et al. |
| 2013/0157683 | A1 | 6/2013 | Lymberopoulos et al. |
| 2014/0354300 | A1 | 12/2014 | Ramachandran et al. |
| 2015/0137830 | A1 | 5/2015 | Keller, III et al. |
| 2016/0097833 | A1 | 4/2016 | Han et al. |
| 2016/0098561 | A1 | 4/2016 | Keller et al. |
| 2018/0011130 | A1 | 1/2018 | Aguayo Gonzalez et al. |
| 2018/0060203 | A1 | 3/2018 | Gupta et al. |
| 2018/0276044 | A1 | 9/2018 | Fong et al. |
| 2018/0349797 | A1 | 12/2018 | Garvey et al. |
| 2019/0102718 | A1 | 4/2019 | Agrawal et al. |
| 2019/0163719 | A1 | 5/2019 | Gross et al. |
| 2019/0196892 | A1 | 6/2019 | Matei et al. |
| 2019/0197045 | A1 | 6/2019 | Kraljevic et al. |
| 2019/0197145 | A1 | 6/2019 | Gross et al. |
| 2019/0243799 | A1 | 8/2019 | Gross et al. |
| 2019/0286725 | A1 | 9/2019 | Gawlick et al. |
| 2019/0378022 | A1 | 12/2019 | Wang et al. |
| 2020/0144204 | A1 | 5/2020 | Keller, III et al. |
| 2020/0387753 | A1 | 12/2020 | Brill et al. |
| 2021/0081573 | A1* | 3/2021 | Gross ................... G06F 21/552 |
| 2021/0158202 | A1 | 5/2021 | Backlawski et al. |
| 2021/0174248 | A1 | 6/2021 | Wetherbee et al. |
| 2021/0270884 | A1 | 9/2021 | Wetherbee et al. |

OTHER PUBLICATIONS

U.S. Nuclear Regulatory Commission: "Technical Review of On-Lin Monitoring Techniques for Performance Assessment vol. 1: State-of-the Art", XP055744715, Jan. 31, 2006, pp. 1-132.
Ray; Frequency Calibration for SDRs Without GPS, pp. 1-9, Feb. 15, 2018; downloaded from: https://www.amsat.org/wordpress/wp-content/uploads/2018/02/2017Symposium-SDR-Freq-Calibration.pdf.
Dickey et al.; Checking for Autocorrelation in Regression Residuals; pp. 959-965; Proceedings of 11th Annual SAS Users Group International Conference; 1986.
Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.
Michael Kan; Does Your Motherboard Have a Secret Chinese Spy Chip?; Oct. 5, 2018, pp. 1-9, downloaded on Sep. 3, 2021 from: https://www.pcmag.com/news/does-your-motherboard-have-a-secret-chinese-spy-chip.
Kenny Gross, Oracle Labs; MSET2 Overview: "Anomaly Detection and Prediction" Oracle Cloud Autonomous Prognostics; p. 1-58; Aug. 8, 2019.
Gribok, et al,. "Use of Kernel Based Techniques for Sensor Validation in Nuclear Power Plants," International Topics Meeting on Nuclear Plant Instrumentation, Controls, and Human-Machine Interface Technologies (NPIC & HMIT 2000), Washington, DC, Nov. 2000, pp. 1-15.
Gross, K. C. et al., "Application of a Model-Based Fault Detection System to Nuclear Plant Signals," downloaded from https://www.researchgate.net/publication/236463759; Conference Paper: May 1, 1997, 5 pages.
Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.
Patent Cooperation Treaty (PCT) International Search Report and Written Opinion of the International Searching Authority in PCT International Application No. PCT/US2021/014106, International filing date Jan. 20, 2021 (Jan. 20, 2021), dated Apr. 26, 2021 (Apr. 26, 2021), 11 pgs.
Huang H, et al. "Electronic counterfeit detection based on the measurement of electromagnetic fingerprint," Microelectronics Reliability: An Internat . Journal & World Abstracting Service, vol. 55, No. 9, Jul. 9, 2015 (Jul. 9, 2015) pp. 2050-2054.
Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.
Patent Cooperation Treaty (PCT) International Search Report and Written Opinion of the International Searching Authority in PCT International Application No. PCT/US2021/013633, International filing date Jan. 15, 2021 (Jan. 15, 2021), dated May 6, 2021 (May 6, 2021), 10 pgs.
1st NF OA dated May 21, 2021 from U.S. Appl. No. 16/820,807, filed Mar. 17, 2020, having a date of mailing of May 21, 2021, 36 pgs.
Deepika et al., Design & development of location identification using RFID with Wi-Fi positioning systems, 2017 Ninth Intl. Conference on Ubiquitous and Future Networks (ICUFN). IEEE, 2017) 6 pgs.
1st NF OA from U.S. Appl. No. 16/804,531, filed Feb. 28, 2020, having a date of mailing of Jul. 20, 2021, 51 pgs.
Wang, Ray C., et al., Process Fault Detection Using Time-Explicit Kiviat Diagrams. AIChE Journal 61.12 (2015):4277-4293.
Abran et al.; Estimation Models Based on Functional Profiles. Intl. Workshop on Software Measurement—IWSM/MetriKon, Kronisburg (Germany), Shaker Verlag. 2004 (Year: 2004).
Gou, Yuhua, "Implementation of 3d Kiviat Diagrams." (2008). (Year: 2008).
Patent Cooperation Treaty (PCT) International Search Report and Written Opinion of the International Searching Authority in PCT International Application No. PCT/US2021/015802, International filing date Jan. 29, 2021 (Jan. 29, 2021), dated May 28, 2021 (May 28, 2021), 13 pgs.
Patent Cooperation Treaty (PCT) International Search Report and Written Opinion of the International Searching Authority in PCT International Application No. PCT/US2021/015359, International filing date Jan. 28, 2021 (Jan. 28, 2021), dated Apr. 9, 2021 (Apr. 9, 2021), 34 pgs.
Patent Cooperation Treaty (PCT) International Search Report and Written Opinion of the International Searching Authority in PCT International Application No. PCT/US2020/060083, International filing date Nov. 12, 2020 (Nov. 12, 2020), dated Mar. 19, 2021 (Mar. 19, 2021), 13 pgs.

(56) References Cited

OTHER PUBLICATIONS

Garcia-Martin Eva et al., "Estimation of Energy Consumption in Machine Learning," Journal of Parallel and Distributed Computing, Elsevier, Amsterdan, NL, vol. 134, Aug. 21, 2019 (Aug. 21, 2019), pp. 77-88.

Patent Cooperation Treaty, "International Search Report and Written Opinion", issued in PCT International Application No. PCT/US2021/062592 (International Filing Date of Dec. 9, 2021) dated Jun. 14, 2022 (13 pgs).

Patent Cooperation Treaty (PCT), International Search Report and Written Opinion issued in PCT International Application No. PCT/US2021/062380 dated May 24, 2022 (10 pgs).

* cited by examiner

COUNTERFEIT DEVICE DETECTION USING EMI FINGERPRINTS

BACKGROUND

It has been estimated that counterfeit electronic components in international supply chains cost $200 billion per year across all industries that use electronics (including the information technology, medical, military, gaming, transportation, and utility sectors). Counterfeit systems often appear so real that service engineers cannot distinguish them from authentic systems by simple visual inspection. However, the counterfeit systems often contain scrap components from discarded systems, cheaply manufactured components, or older components from recycled vintage systems, which are repackaged to resemble authentic systems.

Such systems are then integrated into the supply chain via brokerage channels. When the counterfeit systems are shipped to customers, they often fail on arrival or within a very short time period causing large warranty losses, shortened mean time between failures, and customer dissatisfaction. In some situations, the counterfeit systems even include spy chips which can grant unauthorized access to or control over the counterfeit system. In the utility sector, the use of counterfeit electronic components is more than a costly nuisance—it is a major safety concern. Failure of utility components can cause life-threatening situations such as blackouts and fires.

The North American Electric Reliability Corporation, (a North American utility regulator) has issued a supply chain risk management regulation (No. CIP-013-1) to reduce risks to the reliable operation of the bulk electrical system. The regulation requires that by July 2020 all utilities on the North American continent must implement technology to detect counterfeit components for all power system assets used in generating facilities, supervisory control and data acquisition (SCADA) subsystems, and distribution-grid assets.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
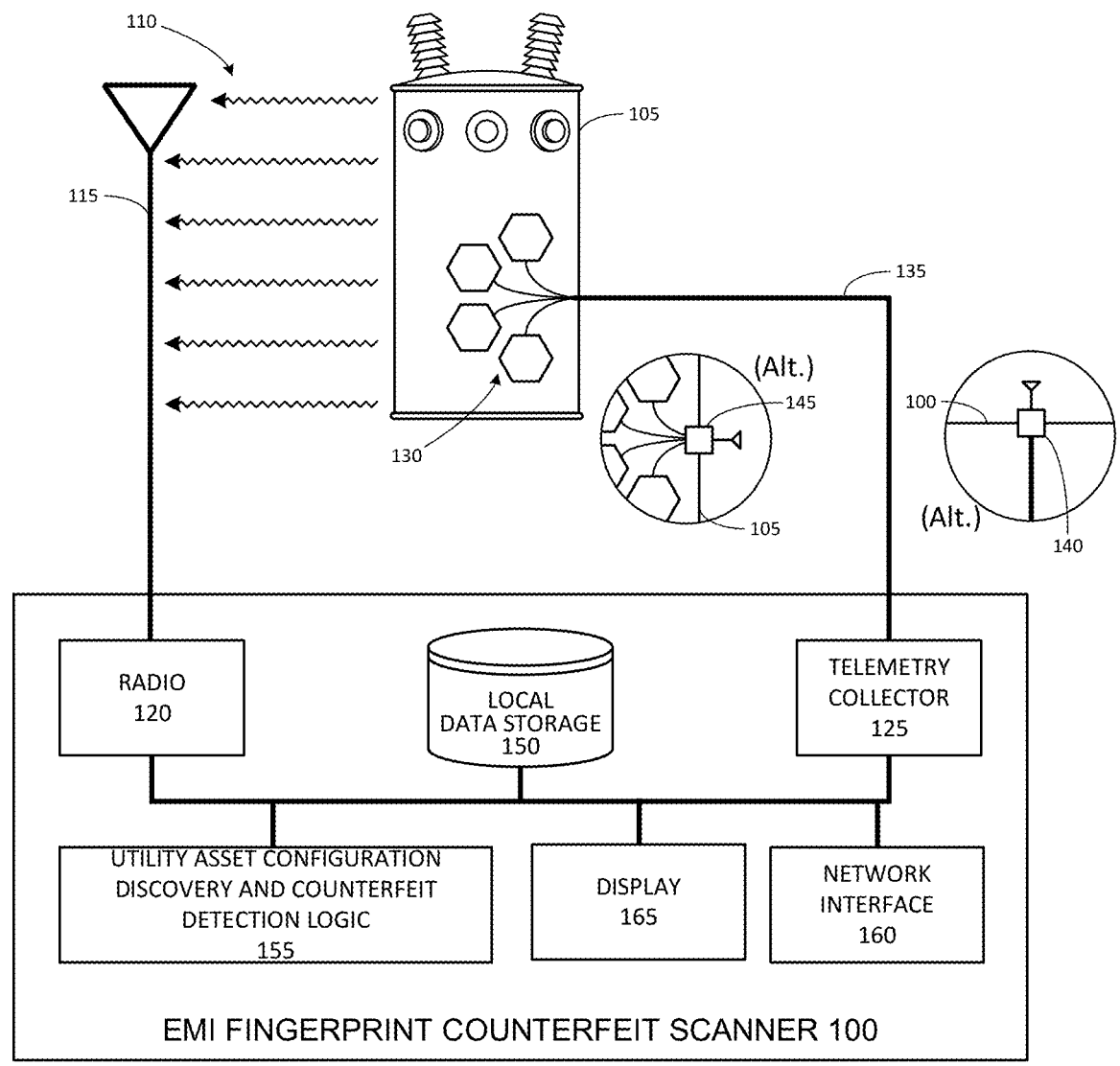
FIG. 1 illustrates one embodiment of an EMI fingerprint counterfeit scanner and an example target utility device.

Systems and methods are described herein that provide automated asset configuration discovery and counterfeit detection in critical utility assets through electromagnetic interference (EMI) fingerprints.

EMI signals are generated by power utility devices such as transformers, generators, inverters, meters, or other electrical grid systems during operation. These EMI signals are commonly regarded as noise, but these EMI signals can also carry information that can be used to generate unique EMI fingerprints (EMIF) for the utility device. For example, the EMI given off by a target utility device with an unknown configuration of components can be scanned to generate a target EMI fingerprint for the target utility device. The generated target EMI fingerprint can be compared with reference EMI fingerprints of reference utility devices of known configurations to confirm that the target utility device is of a known make, model, and configuration, or notify that the target utility device is not of a known make, model, and configuration and therefore may contain one or more suspected counterfeit components, or may be suspected to be entirely counterfeit.

Counterfeit detection for power utility devices is most conveniently performed at points along the supply chain prior to final installation of the utility device, for example at loading or receiving docks, or at ports of entry or egress or other government boundaries. Persons performing the EMI fingerprint scans at these locations have little time to dedicate to the scanning. But, requiring the person doing the scan to ascertain the exact make, model, and internal component configuration of a target utility device before scanning the target utility device is a labor-intensive and error-prone process.

Note that there are actually more permutations of allowable internal authentic component configurations than just the number of makes and models of utility devices. The make and model assigned to a utility device does not necessarily change every time an internal component is upgraded in a new production run of the utility device (this is especially true for complex and/or high-cost utility devices). So even though the make and model may not change for years, the internal components may change with the "vintage" of shipping or production run of the utility device. For example, internal components may change because internal components are produced or purchased in incremental batches. While the batches meet all quality and performance specifications, they may have different EMI characteristics. These multiple internal component refreshes may result in multiple distinct EMI Fingerprints for genuine utility devices of the same make and model according to the vintage of the shipping or production dates, but this information may not be readily available to the person performing the EMI fingerprint scans. Thus, it can be impossible for the person performing the EMI fingerprint scans to fully identify the internal configuration of target device with simple inspection.

But, selection of the wrong make, model, and internal component configuration for the reference EMI fingerprint is likely to result in a false positive identification of a target utility device as a potential counterfeit. Thus, it is not feasible or desirable to have the persons conducting the scans to have to identify and enter into the scanning instrumentation the exact make, model, and internal component configurations for the utility device being scanned.

Instead, the scanning procedure needs to be quick, as effortless as possible, and completely agnostic to whatever make, model, and component configuration of target utility device is being scanned. Further, persons performing the EMI fingerprint scans at these locations need a scanning procedure that does not require the person doing the scanning to possess an advanced data science degree to interpret the results.

In one embodiment, the make/model and internal component manufactures for each target utility device scanned is automatically detected by a novel autonomous utility asset make, model, and component configuration discovery pattern recognition framework. In one embodiment, a reference EMI fingerprint is taken from a reference utility device for make, model, and configuration (or "type") of utility device. The reference utility device for a make, model, and configuration is one that is confirmed to be a genuine example of the make, model, and configuration of utility device (a "Golden System"). In one embodiment, the target utility device undergoes an iterative pattern recognition process that compares a target EMI fingerprint against a library of reference EMI fingerprints using a configuration similarity metric called EMI Fingerprint Surface Mean Absolute Error (EMIF SMAE). The recognition process will quickly infer the configuration of the target utility device (or unit under test (UUT)), and then present either an alert on possible counterfeits, or a certification that the asset just scanned is a genuine, authentic, allowable configuration and contains no counterfeits.

Although we describe the present invention in the context of a power utility device, the general principles and techniques of the present invention can be applied to any electronic system that comprises at least one electronic component.

—Example EMI Fingerprint Counterfeit Detector—

FIG. 1 illustrates one embodiment of an EMI fingerprint counterfeit scanner 100 and an example target utility device 105. EMI fingerprint counterfeit scanner 100 includes an antenna (or other EMI signal sensor) 115 connected to a radio 120 such as a software-defined radio. In one embodiment, EMI fingerprint counterfeit scanner 100 also includes a telemetry collector 125 which may be connected to sensor components 130 of target utility device 105 by telemetry bus 135 or alternatively by radio frequency transmission between transceivers 140 and 145. EMI fingerprint counterfeit scanner 100 also includes local data storage 150 connected to radio 120 and telemetry collector 125. EMI fingerprint counterfeit scanner 100 also includes utility device configuration discovery and counterfeit detection logic 155. EMI fingerprint counterfeit scanner 100 also includes network interface 160 and a display 165.

Note that utility device 105 generates EMI signals 110 when power is provided to the utility device 105. Note further that the utility device 105 may continue to generate EMI signals 110 after power to the utility device 105 is cut, at least for a time. The EMI signals are generated from one or more internal components of the utility device 105, which may include, but are not limited to controls, switches, motors, inductor/transformer windings, capacitors, sensors, and other components. In some instances, the EMI signals may be generated by interactions between multiple components. In one embodiment, antenna 115 is configured to sense EMI signals 110 and apply the EMI signals to radio 120 that is coupled to antenna 115. Depending on the configuration of antenna 115 and radio 120, the EMI signals are sensed across a broad spectrum of frequencies, for example from approximately 1 megahertz up to approximately 4 gigahertz.

In one embodiment, antenna 115 may include: a dipole antenna, a Yagi-Uda antenna, a loop antenna, an electrical short antenna (e.g., an open-ended wire having a length less than a quarter wavelength), a fractal antenna, a parabolic antenna, a microstrip antenna, a quad antenna, a random wire antenna (e.g., an open-ended wire having a length greater than one wavelength), a beverage antenna, a helical antenna, a phased array antenna, and any other type of antenna now known or later developed. In one simple and inexpensive embodiment, antenna 115 may be an insulated wire with a fixed length of the insulation stripped off. In one embodiment, the type and length of the antenna can be selected to achieve optimal discrimination sensitivity and robustness.

Antenna 115 can be positioned either in close proximity to the target utility device 105, or further away from the target utility device 105. To achieve better sensitivity in antenna 115 and hence higher signal-to-noise ratio (SNR) in EMI fingerprint counterfeit scanner 100, a smaller distance between the target utility device 105 and antenna 115 is preferred. In addition to distance, the sensitivity of antenna 115 can also be affected by its orientation with respect to the target utility device 105.

In one embodiment, antenna 115 is positioned at a predetermined distance and orientation with respect to target utility device 105 during a scan. This predetermined distance and orientation may be the same distance and orientation used to detect reference EMI signals from a reference utility device of the same make and model as the target utility device 105. The consistency of antenna placement with respect to the utility devices being scanned can increase the ability of the EMI fingerprint counterfeit scanner 100 to match target EMI fingerprints with reference EMI fingerprints, and distinguish target EMI fingerprints from reference EMI fingerprints.

In one embodiment, the antenna 115 may be affixed to the EMI fingerprint counterfeit scanner 100. In one embodiment, the antenna 115 may be in a fixed position (distance and orientation) with respect to the target utility device 105 during a scan of the target utility device 105 by the EMI fingerprint counterfeit scanner 100. For example, the antenna 115 may be placed in a location proximate to the target utility device 105 and not moved during the scan. The antenna 115 may be affixed to a housing of the target utility device 105, or may be affixed within the housing of target utility device 105. In one embodiment, multiple antennas and radios (not shown) may be positioned at different locations and orientations with respect to the target utility device 105 during the scan. In one embodiment, antenna 115 is moved to multiple different locations and orientations with respect to the target utility device 105 over the course of the scan. Implementations of these various antenna positions and configurations, as well as other positions and configurations, may be selected as desirable to improve signal-to-noise ratio (SNR) of the detected EMI signals for the overall target utility device 105, or to emphasize EMI signals emitted by specific components the target utility device 105.

In one embodiment, radio 120 is configured to convert the received EMI signals from analog signals to digital signals, and record the power amplitude and frequency of the signals at defined time intervals. In one embodiment, radio 120 may store the recorded signals as a data structure in local data storage 150, or provide them directly to utility asset configuration discovery and counterfeit detection logic 155 for analysis.

Utility devices such as target utility device 105 are commonly manufactured with sensor components 130 that provide sensor telemetry signals describing the status of various aspects of the utility device, such as temperature, current, voltage, or other detectable information. For example, the sensor components 130 may be configured to interface with a remote terminal unit (RTU) of a SCADA or other distributed control system. In one embodiment, the telemetry collector 125 is configured to present an RTU interface to sensor components 130.

In one embodiment, telemetry collector 125 receives and processes the sensor telemetry signals. For example, the telemetry collector 125 may parse sensor telemetry signals received over telemetry bus 135 to extract status information. The telemetry collector 125 may then store that status information as a data structure in local data storage 150, or provide them directly to utility asset configuration discovery and counterfeit detection logic 155 for analysis.

In one embodiment, local data storage 150 is the local data store of the mobile device or computer. In one embodiment, utility asset configuration discovery and counterfeit detection logic 155 is a processor of the mobile device or computer specially configured with instructions to execute one or more of the functions of the system described herein.

—Example Environment for EMI Fingerprint Scanning—

Figure 2:
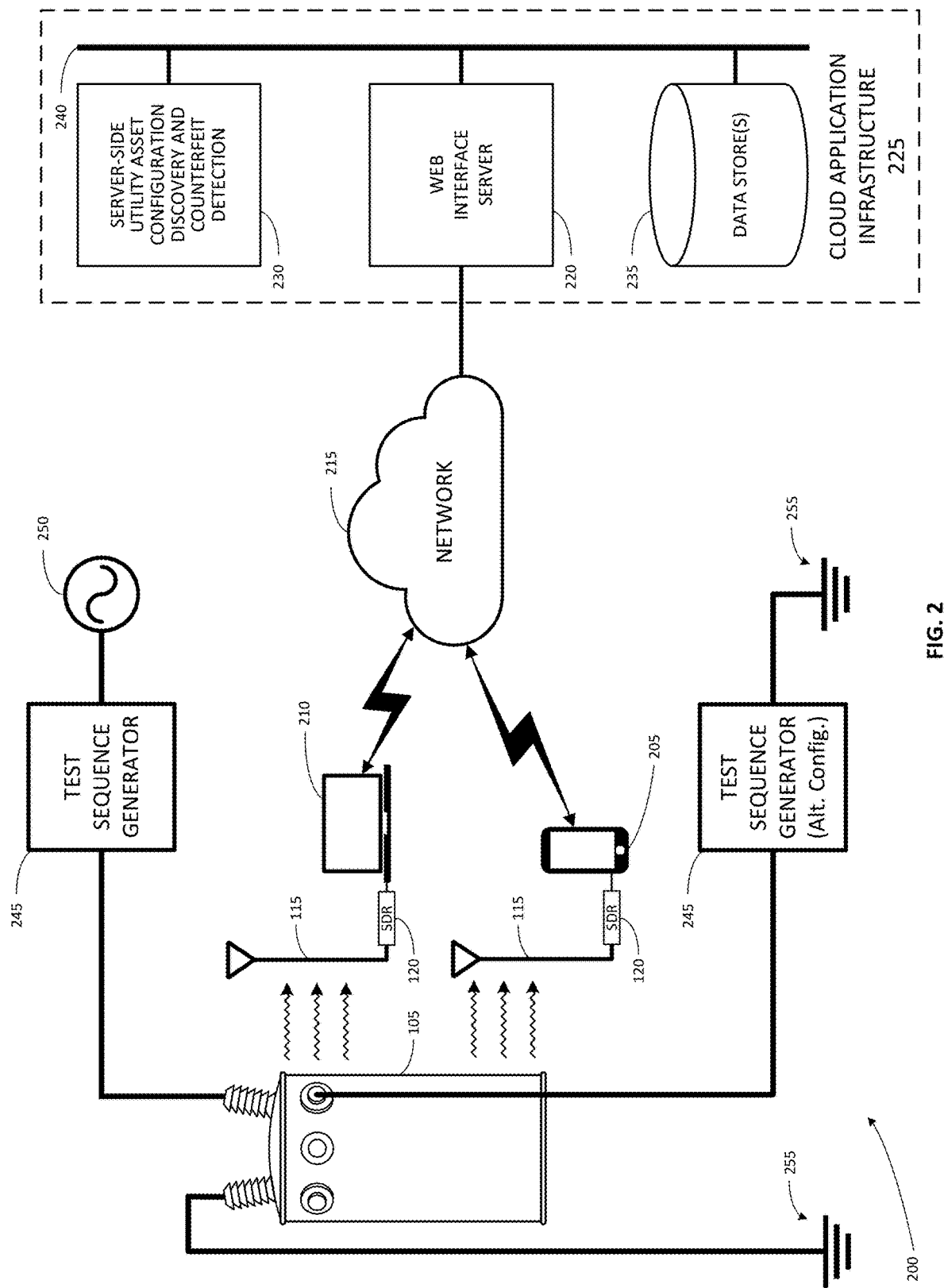
FIG. 2 illustrates one embodiment of an environment in which to operate EMI fingerprint counterfeit scanner.

FIG. 2 illustrates one embodiment of an environment 200 in which to operate EMI fingerprint counterfeit scanner 100.

In one embodiment, EMI fingerprint counterfeit scanner 100 is a mobile device 205 or computer 210 coupled with a software defined radio 120 and antenna 115. In one embodiment, network interface 160 is configured to enable the EMI fingerprint counterfeit scanner 100 to interact with one or more remote computers over a communications network 215. In one embodiment, the EMI fingerprint counterfeit scanner 100 may send requests to and receive responses from web servers such as web interface server 220. These communications may take the form of remote representational state transfer (REST) requests using JavaScript object notation (JSON) as the data interchange format, or simple object access protocol (SOAP) requests to and from XML servers.

In one embodiment, web interface server 220 is configured to enable EMI fingerprint counterfeit scanner 100 to access resources provided by cloud application infrastructure 225. In addition to web interface server 220, the cloud application infrastructure 225 also includes server-side utility asset configuration discovery and counterfeit detection system 230 and one or more data storage devices 235. The web interface server 220, system 230, and data storage devices 235 are interconnected by a local network 240. In one embodiment, server-side utility asset configuration discovery and counterfeit detection system 230 is one or more computing devices specially configured with instructions to execute one or more of the functions of the system described herein. In one embodiment, the analysis of target EMI fingerprints is performed by server-side utility asset configuration discovery and counterfeit detection system 230 in response to a request from EMI fingerprint counterfeit scanner 100, and the results are returned to EMI fingerprint counterfeit scanner 100 for display to the user. In another embodiment, the analysis of target EMI fingerprints is performed by EMI fingerprint counterfeit scanner 100.

In one embodiment, a test sequence generator 245 is also provided. The test sequence generator 245 operates to that control the power through one or more components in the target utility device 105. In operation, the test sequence generator 245 may create square waves of power amplitude through components of the target utility device 105. The instructions for the test sequence, including amplitude and duration of the square waves, may be pre-programmed in the test sequence generator 245 and/or be controlled by the EMI fingerprint counterfeit scanner 100.

In one embodiment, for some types of utility devices, appropriate square waves may be generated by toggling the power supply delivered to the target utility device 105 between a high-power and a low-power supply state to place the target utility device 105 into an "energized" operating state (at high power supply) and a "de-energized" operating state (at low power supply). In one embodiment, the energized state may be a full-power power supply state. In one embodiment, the energized state may be a power supply state that is relatively higher than the low-power supply state, and the de-energized state is a power supply state that is relatively lower than the high-power supply state. In one embodiment, the de-energized state may be a power supply state of complete cut off of the power supply—a "no power" power supply state. In one embodiment, the de-energized state may be an "idle" power supply state, where the power supplied to the target utility device 105 is the minimum power necessary maintain operation of the target utility device 105 at the lowest possible power level. In this configuration, the test sequence generator 245 is placed in-line between the power supply 250 and the target utility device 105 and controls the delivery of power from power source 250 to the target utility device 105. The test sequence generator is configured to provide a test sequence of high-power and low-power power supply to the target utility device 105 in accordance with instructions for a test sequence of energizing and de-energizing the target utility device 105.

In another embodiment, for some types of utility devices, appropriate square waves may be generated by toggling a load on the target utility device 105 between a high-power and a low-power draw state to place the target utility device 105 into the energized operating state (at high power draw) and the de-energized operating state (at low power draw). In one embodiment, the energized state may be a full-power power draw state. In one embodiment, the energized state may be a power draw state that is relatively higher than the low-power draw state, and the de-energized state is a power draw state that is relatively lower than the high-power draw state. In one embodiment, the de-energized state may be a power draw state of complete cut off of the load—a "no power" power draw state. In one embodiment, the de-energized state may be an "idle" power draw state, where the power drawn from to the target utility device 105 is the minimum power necessary maintain operation of the target utility device 105 at the lowest possible power level. In this alternate configuration, the test sequence generator 245 is placed in-line between the target utility device 105 and ground 255 and controls the power load drawn from target utility device 105. The test sequence generator is configured to provide a test sequence of high-power and low-power power draw (load) to the target utility device 105 in accordance with instructions for a test sequence of energizing and de-energizing the target utility device 105.

In one embodiment, the test sequence generator 245 can be added to a staging area for initial Power-On-Self-Testing. Utility assets are commonly unpackaged and then first energized in POST testing before installing in production systems. Accordingly, it is a convenient time to perform the EMI fingerprint counterfeit scan while the target utility device is set up for POST testing. In one embodiment, the test sequence is applied to the target utility device while the target utility device is set up in a staging area for testing.

—Example Configuration Discovery and Counterfeit Detection Method—

In one embodiment, one or more steps of methods described herein may be performed by a processor (such as processor 1710 as shown and described with reference to FIG. 17) of one or more computing devices (i) accessing memory (such as memory 1715 and/or other computing device components shown and described with reference to FIG. 17) and (ii) configured with logic to cause the system to execute the step of the method (such as utility asset configuration discovery and counterfeit detection logic 1730 shown and described with reference to FIG. 17). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 1715, or storage/disks 1735 of computing device 1705 or remote computers 1765 shown and described with reference to FIG. 17). In one embodiment, a subsequent step of a method may commence in response to parsing a signal received or stored data retrieved indicating that the previous step has been performed at least to the extent necessary for the subsequent step to commence. Generally, the signal received or the stored data retrieved indicates completion of the previous step.

Figure 3:
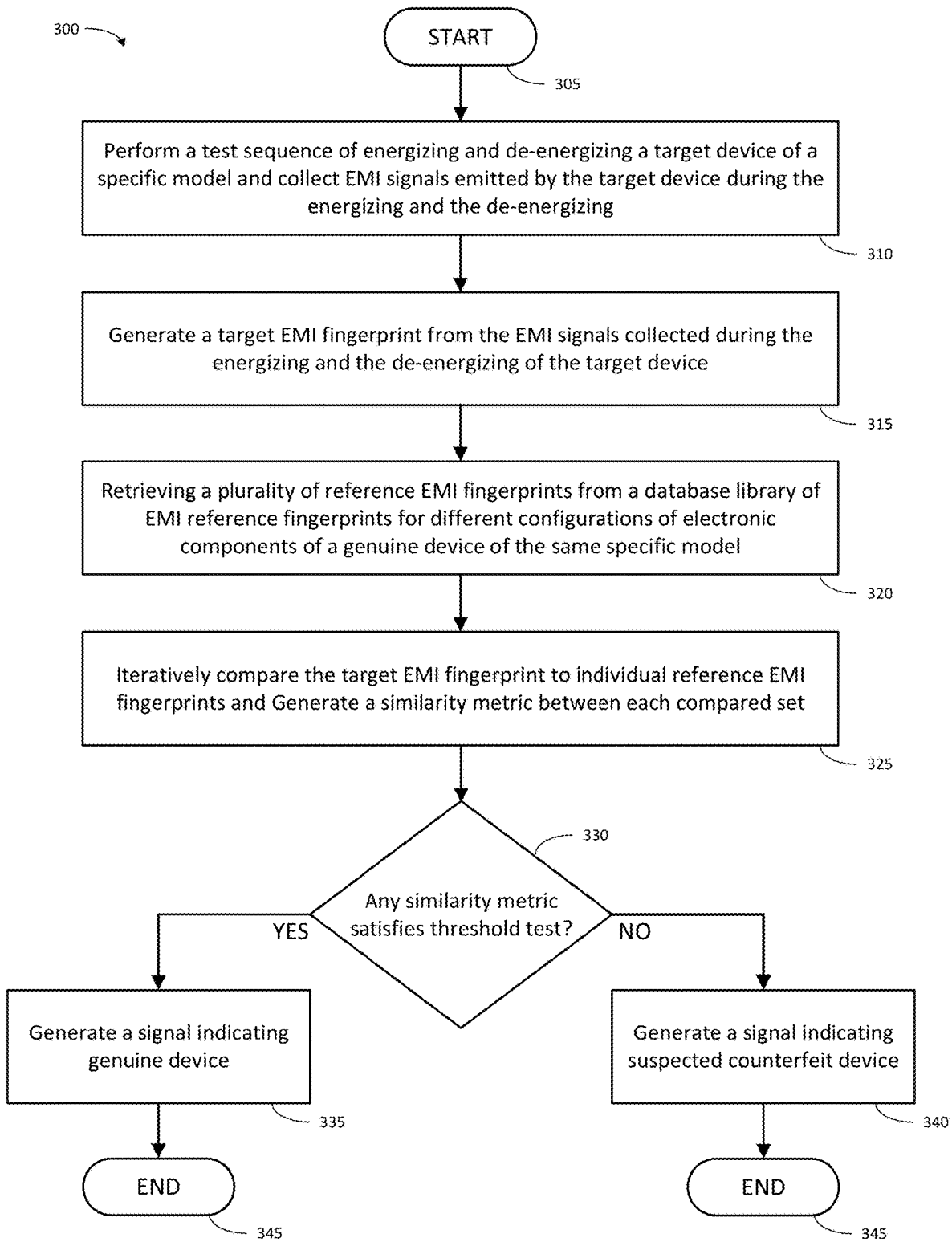
FIG. 3 illustrates one embodiment of a method associated with utility asset configuration discovery and counterfeit detection.

FIG. 3 illustrates one embodiment of a method 300 associated with utility asset configuration discovery and counterfeit detection. The method 300 is a method for detecting whether a target utility device that includes a plurality of electronic components is genuine or suspected counterfeit (for example, containing at least one counterfeit component).

The method 300 may be initiated based on various triggers, such as receiving a signal over a network or parsing stored data indicating that (i) a user (or administrator) of EMI fingerprint counterfeit scanner has initiated method 300, or (ii) other trigger. The method 300 initiates at START block 305 in response to parsing a signal received or stored data retrieved and determining that the signal or stored data indicates that the method 300 should begin. Processing continues to process block 310.

At process block 310, the system performs a test sequence of energizing and de-energizing the target device of a specific model and collects electromagnetic interference (EMI) signals emitted by the target device during the energizing and the de-energizing. Processing at process block 310 then completes, and processing continues to process block 315.

At process block 315, the system generates a target EMI fingerprint from the EMI signals collected during the energizing and the de-energizing of the target device. Processing at process block 315 completes, and processing continues to process block 320.

At process block 320, the system retrieves a plurality of reference EMI fingerprints from a database library. Each reference EMI fingerprint corresponds to a different configuration of electronic components of a genuine device of the same specific model as the target device. Also, each reference EMI fingerprint is generated from reference EMI signals collected during performance of an energizing and de-energizing sequence on the corresponding configuration of the genuine device. Processing at process block 320 completes, and processing continues to process block 325.

At process block 325, the system iteratively compares the target EMI fingerprint to individual reference EMI fingerprints in the plurality of reference EMI fingerprints and generates a similarity metric between each compared set of the target EMI fingerprint and the individual reference EMI fingerprint. Processing at process block 325 completes, and processing continues to decision block 330.

At decision block 330, the system determines whether the similarity metric for any individual reference EMI fingerprint satisfies a threshold test. If the similarity metric for any individual reference EMI fingerprint satisfies a threshold test (YES), processing at decision block 330 completes and processing continues to process block 335. If no similarity metric for any individual reference EMI fingerprint satisfies the threshold test (NO), processing at decision block 330 completes and processing continues to process block 340.

At process block 335, the system generates a signal indicating that the target device is a genuine device. Processing at process block 335 completes, and processing continues to END block 345, where process 300 ends.

At process block 340, the system generates a signal indicating that the target device is a suspect counterfeit device. Processing at process block 335 completes, and processing continues to END block 345, where process 300 ends.

Each of the foregoing process blocks of method 300 is described in further detail below.

—Performing Test Sequence and Collecting Signals—

Referring again to process block 310, in one embodiment, the test sequence of energizing and de-energizing the target device of a specific model is performed, for example, by test sequence generator 245. In one embodiment, the test sequence of energizing and de-energizing the target device includes multiple energizations or de-energizations. In one embodiment, the test sequence cycles between approximately equal portions of (i) providing high power supply or load to place the target device in an energized state, and (ii) providing low power supply or load to place the target device in a de-energized state. In one embodiment, a test sequence with a cycle of 30 seconds at high power supply or load to the target device (energized) and 30 seconds at low power supply or load to the target device (de-energized) may be appropriate. In other embodiments, other test sequences may be appropriate, for example with shorter or longer energize/de-energize periods, or with unequal energize/de-energize periods. In one embodiment, the test sequence generator is configured to automatically control power or load to alternately energize and de-energize the target device in a repeatable test sequence.

In one embodiment, where the test sequence generator 245 controls the power supply to the target device, test sequence generator 245 provides high-power and low-power from power supply 250 to an input (such as one of the primary terminals of a transformer) to respectively energize and de-energize the target device in a test sequence. For example, power to the target device is alternatively provided and interrupted in a repeated cycle. In another embodiment, where the test sequence generator 245 controls the power load drawn from the target device, test sequence generator 245 provides high-power and low-power loads on an output (such as one of the secondary terminals of a transformer) to respectively energize and de-energize the target device in a test sequence. For example, load on the target device is alternatively exerted and ceased in a repeated cycle.

In one embodiment, the test sequence performed on the target device at process block 310 is the same test sequence originally performed on the reference devices to generate their respective reference EMI fingerprints. In other words, the same test sequence is used for generating both the reference EMI fingerprint and the target EMI fingerprint.

Referring still to process block 310, in one embodiment, the antenna 115 and radio 120 collect electromagnetic interference (EMI) signals emitted by the target device during the energizing and the de-energizing implemented by test sequence generator 245. In one embodiment, EMI fingerprint counterfeit scanner 100 is configured to collect, using software defined radio 120 and antenna 115, electromagnetic interference (EMI) signals emitted by a target device while the target device is energized and then de-energized in a repeatable test sequence. The antenna(s) may be positioned as described above with reference to FIG. 1 during the collection of the EMI signals. The collection of EMI signals from the target device may be referred to as "scanning" the target device. The EMI signals are collected from the target device while the target device is both energized and de-energized. For example, collecting EMI signals from the target device that are emitted during the energizing and the de-energizing includes collecting a first set of EMI signals while the target device is energized and collecting a second set of EMI signals while the target device is de-energized. In other words, the continuous time series signals that include the "tops" of the square waves (representing high-power or energized states) and "bottoms" of the square waves (representing low-power or de-energized states). When the target utility device is turned off, the bottoms of the square waves are at zero. When the target utility device is toggled to "idle," then the bottoms of the square waves are not at zero, but at some low power state. But, regardless of the nature of the EMI signals collected for the bottoms of the square waves, the entire collected square wave sequence for the target EMI signals, both tops and bottoms, is included in the target EMI fingerprint. The target EMI fingerprint is generated from a combination of the first set of EMI signals and the second set of EMI signals. The second set of EMI signals may be useful for generating an EMI fingerprint even when the target utility device is turned off at the low-power state because a target device may continue to generate EMI signals even after power to the utility device is cut. Thus, the bottoms of the square waves are treated no differently than the tops of the square waves when generating the target EMI fingerprint. All periodic repetitions of the tops and bottoms are included in one long time series over the test sequence.

—Generating a Fingerprint—

Referring again to process block 315, in one embodiment, the system generates a target EMI fingerprint from the EMI signals collected during the energizing and the de-energizing of the target device. As discussed above, in one embodiment, the collected signals include EMI signals collected both while the target device is in an energized state, and while the target device is in a de-energized state.

Figure 4:
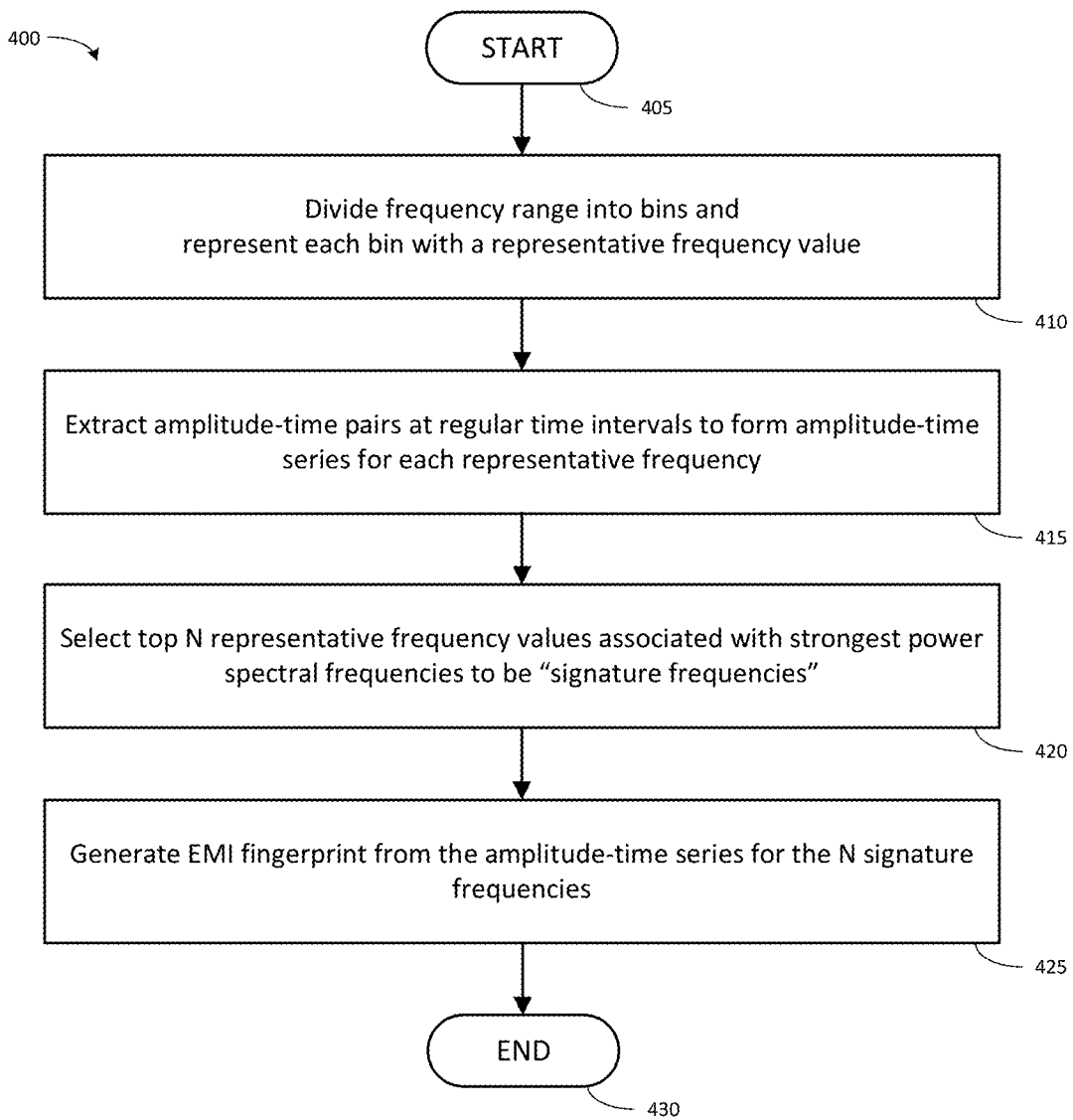
FIG. 4 illustrates one embodiment of a method associated with generating an EMI fingerprint from EMI signals collected during energizing and de-energizing a utility device.

FIG. 4 illustrates one embodiment of a method 400 associated with generating an EMI fingerprint from EMI signals collected during energizing and de-energizing a utility device, such as at process block 315 of method 300. Note that both the target EMI fingerprint for the target utility device and the reference EMI fingerprint for the reference (confirmed authentic) utility device can be generated from collected EMI signals in a similar manner. The method 400 initiates at START block 405 in response to parsing a signal received or stored data retrieved that indicates that the method 400 should begin. Processing continues to process block 410.

At process block 410, the system divides the frequency range associated with the collected EMI signals into a plurality of "bins," and represents each discrete bin with a representative frequency value. In one embodiment, these frequency bins and the associated frequency values are equally spaced. In one embodiment the bins and representative frequencies are stored in local data storage 150 or Data Store 235. Processing at process block 410 completes, and processing continues to process block 415.

At process block 415, the system extracts amplitude-time pairs at regular time intervals (such as once every second) for each representative frequency value to form an amplitude-time series for that representative frequency. In one embodiment, the amplitude-time pairs can be retrieved from a data structure of recorded signals stored in local data storage 150, and the resulting series may be stored in local data storage 150 or Data Store 235. Processing at process block 415 completes, and processing continues to process block 420.

At process block 420, the system selects a subset of N representative frequency values that are associated with the strongest power spectral frequencies. Signals that have the highest signal-to-noise ratio commonly have the highest peaks on a power-spectral density (PSD) plot. In one embodiment, a transform such as a fast Fourier transform (FFT) is performed for the amplitude-time series for each representative frequency. The representative frequencies are ranked in order of the results of the transform, ranking the representative frequencies in order of height of peaks. The top N representative with the highest peaks are selected. In one embodiment of the present invention, N is typically less than or equal to 20. These N selected frequencies may be referred to as "signature frequencies." In one embodiment, an indicator of the signature frequencies may be stored in local data storage 150 or Data Store 235. Processing at process block 420 completes, and processing continues to process block 425.

At process block 425, the system generates the EMI fingerprint using the amplitude-time series associated with the signature frequencies. In one embodiment, the generated EMI fingerprint is stored in local data storage 150 or Data Store 235. Processing at process block 425 completes, and processing continues to END block 430, where process 400 ends.

—Retrieving Reference EMI Fingerprints—

Referring again to method 300, at process block 320, the system retrieves a plurality of reference EMI fingerprints from a database library. In one embodiment, the database library is a repository of reference EMI fingerprints for all possible valid permutations component configurations of all genuine make and model of reference utility device. For each make, model, and configuration, the reference EMI fingerprint is created by performing the test sequence on and collecting the emitted EMI signals from a utility device that is authenticated, confirmed, or otherwise known to be a genuine example of that make, model and configuration of utility device. The resulting EMI fingerprint is then stored in the database library with reference to the make, model, and configuration of the utility device. In one embodiment, the database library is maintained remotely, such as on a cloud server, for example in data store 235. The EMI fingerprint counterfeit scanner 100 initiates the retrieval with a request (such as a REST request) to web interface server 220 to retrieve the reference EMI fingerprints from data store 235.

Web interface server 220 retrieves the reference EMI fingerprints from data store 235 and returns the reference EMI fingerprints with a REST request transmitted to the network interface 160 of the EMI fingerprint counterfeit scanner 100. In another embodiment, the database library is maintained in the local data storage 150 of the EMI fingerprint counterfeit scanner 100. The EMI fingerprint counterfeit scanner 100 generates and executes a command to retrieve the reference EMI fingerprints from local data storage 150. The locally maintained database library may be updated from time to time against the database library maintained on the cloud.

In one embodiment, the EMI fingerprint counterfeit scanner 100 is configured to retrieve a plurality of reference EMI fingerprints from a data store. In one embodiment, the reference EMI fingerprint corresponds to a genuine reference device of the specific model and further corresponds to a distinct configuration of electronic components for the genuine reference device of the specific model.

—Pre-Classification of Target Utility Device—

In one embodiment, similar utility devices may exhibit similar characteristics detectable by sensor components 130. As discussed above, there may be many component configurations of a given make-model of utility device. Even though the various makes, models, and component configurations of utility device may have completely different banks for transducers and different numbers of sensors, what is relevant to configuration discovery is the general patterns exhibited by utility devices. Information detected by sensor components 130 and provided to telemetry collector 125 enables the EMI fingerprint counterfeit scanner to determine one or more of:

1. A rate of change of individual gasses (i) per external ambient temperature, and (ii) per load signatures (from winding currents);
2. A delta in temperature signals, for example, the readings of internal temperature sensors minus ambient external temperature per load signatures;
3. Moving window Partial Discharge Correlation Coefficients for partial discharge signals (when available) compared with a bivariate function of ambient temperature and load signatures; and
4. Normalized ratios of other signals that show trends pre-failure for utility devices that experienced degradation in the field, but do not show the same patterns in any of the healthy assets.

Figure 5:
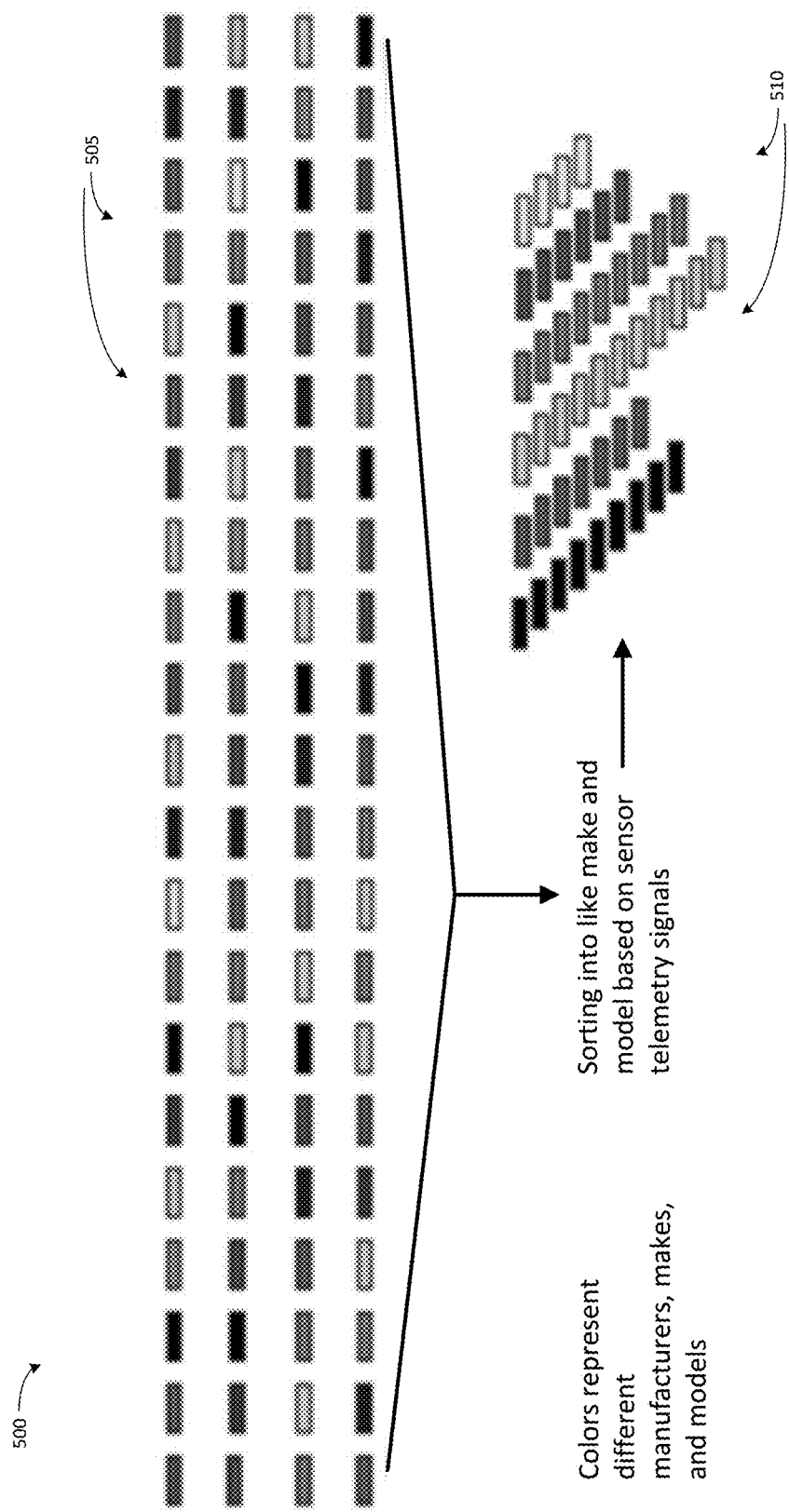
FIG. 5 illustrates example utility devices with different makes/models pre-classified using sensor telemetry signals into categories of like makes and models.

For example, a utility device of a first make and model may operate between 80 and 100 degrees, while a utility device of a second make and model may operate between 150 and 200 degrees. These physical characteristics can be detected by the sensor components 130 and demonstrate that these two types are of a completely different nature. Thus, based on one or more of the sensor telemetry signals and the metrics derived from them, a wide variety of utility device make, model, and component configurations can be classified, as illustrated in FIG. 5. FIG. 5 shows example utility devices 505 with different makes/models pre-classified using sensor telemetry signals into categories of like makes and models 510.

In one embodiment, a target utility device can therefore be pre-classified as belonging to a specific make and model subset of set of all possible types of make, model, and component configuration based on sensor telemetry readings. This reduces the number of reference EMI fingerprints that need to be retrieved and compared against the target EMI fingerprint. The reduction in reference EMI fingerprints for comparison can be highly significant. For example, where the database library contains tens of thousands of reference EMI fingerprints, the ability to identify a target utility device as belonging to a specific make and model will reduce the number of reference EMI fingerprints for comparison to only the select few that are associated with that make and model. This reduction in number of comparisons greatly reduces the time required to identify a target utility device as either genuine or suspected counterfeit, and also reduces retrieval processing load on the cloud application infrastructure 225.

Figure 6:
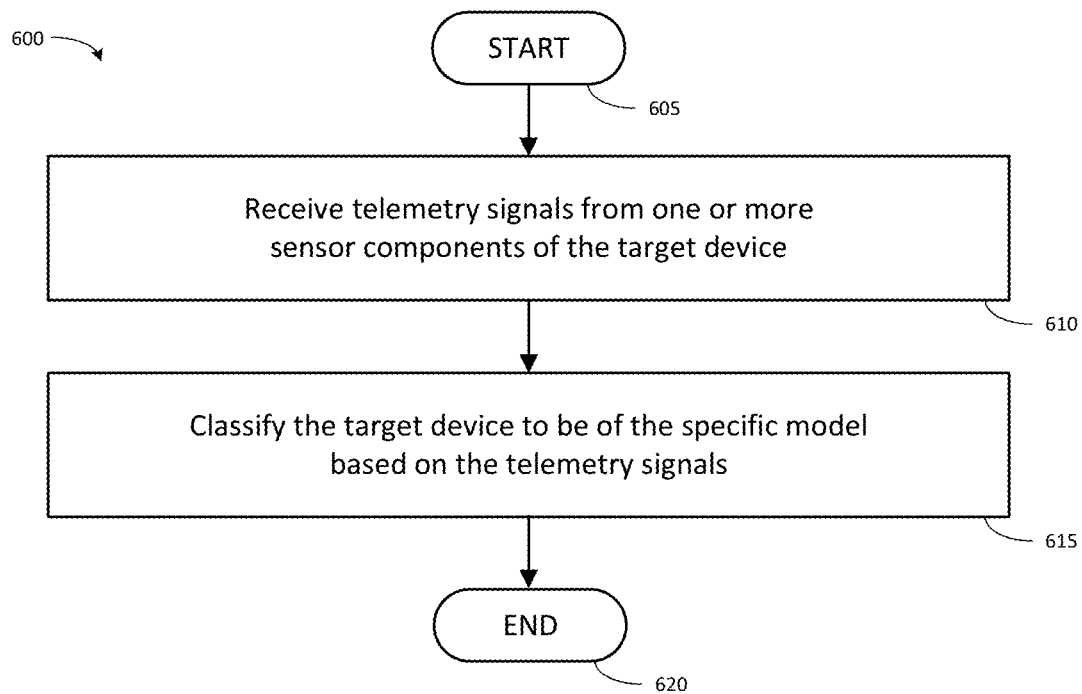
FIG. 6 illustrates one embodiment of a method associated with pre-classifying a target utility device based on sensor telemetry readings.

FIG. 6 illustrates one embodiment of a method 600 associated with pre-classifying a target utility device based on sensor telemetry readings. The method 600 may be initiated based on various triggers, such as receiving a signal over a network or parsing stored data indicating for example that a user of the EMI fingerprint counterfeit scanner 100 has initiated method 600. The method 600 initiates at START block 605 in response to a trigger indicating that the method 600 should begin. Processing continues to process block 610.

At process block 610, the system receives telemetry signals from a sensor component of the target device. In one embodiment, the EMI fingerprint counterfeit scanner 100 receives telemetry signals from sensor components 130 through telemetry collector 125. Processing at process block 610 completes, and processing continues to process block 615.

At process block 615, the system classifies the target device to be of the specific model based on the telemetry signals. In one embodiment, the system trains a machine learning model (such as multivariate state estimation technique denoted by "MSET" later) on the sensor telemetry information for genuine utility devices that are labeled as to make and model of the sensed utility device. The sensor telemetry signals received from the target utility device are provided to the trained machine learning model to assign a make and model. In one embodiment, the reference EMI fingerprints retrieved from the database library are limited to those applicable to the make and model identified. In other words, the retrieval of the plurality of reference EMI fingerprints from the database library (at process block 320 of method 300) is based on the classification of the target device. Processing at process block 615 completes, and processing continues to END block 620, where process 600 ends.

The foregoing sensor telemetry pre-classification analysis is a convenient front-end preprocessing that reduces the time and compute burden required by the automated configuration discovery for counterfeit detection by significantly reducing the number of reference EMI fingerprints that will need to be iteratively compared with the target EMI fingerprint.

—Iteratively Comparing EMI Fingerprints—

Referring again to process blocks 325 through 340, the system iteratively compares the target EMI fingerprint to individual reference EMI fingerprints in the plurality of reference EMI fingerprints and generates a similarity metric between each compared set of the target EMI fingerprint and the individual reference EMI fingerprint. In one embodiment, the M reference EMI fingerprints are each compared to the target EMI fingerprint in turn. The comparison process continues until (i) an individual reference EMI fingerprint is found where the generated similarity metric satisfies a threshold test, or (ii) after comparing the target EMI fingerprint with each of the M reference EMI fingerprints, no similarity metric satisfied the threshold test. Satisfying the threshold test indicates that the target EMI fingerprint and the reference EMI fingerprint are a match, and failing to satisfy the threshold test indicates that the target EMI fingerprint and the reference EMI fingerprint do not match.

In one embodiment, multiple target EMI fingerprints from multiple target utility devices have been acquired, for example in a process where the EMI fingerprint scan is completed for multiple target devices, and then stored for later batch processing. The M reference EMI fingerprints and N target EMI fingerprints are paired through a permutation operation that systematically considers all possible reference-target pairs. As above, a similarity metric is generated for each comparison, and satisfaction of the threshold test indicates a match, while failure indicates a non-match between the compared EMI fingerprints.

If the similarity metric is satisfied by any of the reference EMI fingerprints, the system generates a signal that the target device is verified to be an authentic, genuine device. If the similarity metric is not satisfied by any of the reference EMI fingerprints, the system generates a signal that the target device is potentially counterfeit, or at least constructed in a configuration that does not have an EMI fingerprint in the database library.

Note that a failure to satisfy the similarity metric, and the resulting signal that the target device is potentially counterfeit, does not necessarily imply that the entire target device is made up of counterfeit components. Instead, it indicates that the target device is suspected of containing one or more counterfeit components. While in some situations the entire target device may be counterfeit, it is more likely that the target device has just one or a few internal counterfeit components. This may be especially true where the target device is a large system made up of many components. Herein, a target utility device may be referred to as "suspected/suspect counterfeit" as a shorthand for "suspected of containing one or more counterfeit components."

In one embodiment, the EMI fingerprint counterfeit scanner 100 is configured to generate and display a visual indication on a graphical user interface that the target device is: (i) genuine where the similarity metric for any individual reference EMI fingerprint satisfies a threshold test, and (ii) suspicious or counterfeit where no similarity metric for any individual reference EMI fingerprint satisfies the threshold test.

In one embodiment, the visual indication may include display of a description of the make, model, and component configuration on a graphical user interface. This may be as simple as displaying the make, model, and configuration numbers or vintage information of the target utility device. Or, this description may include additional information about the particular configuration of the target utility device.

In one embodiment, a "Green Light" annunciation is presented if each target utility device (UUT) is certified to be free of internal counterfeit component. Or, a "Red Light Alarm" is presented a target utility device (UUT) is suspected of possessing one or more internal counterfeits. The system may flag the target utility device (UUT) for subsequent detailed analysis by Services and Security personnel, for example by storing the flag as a data structure in data store 235.

In one embodiment, where the signal indicates that the target device is a genuine device, the system displays a visual indication on a graphical user interface that the target device is genuine. For example, the visual indication may be display of a large, green icon that indicates that the target utility device is "genuine," "authentic," "verified," or other language indicating that the target EMI fingerprint for the target utility device matches a reference EMI fingerprint for a genuine article.

The alarm will also trigger if there is a system that is authentic but for which there is not yet a reference (GS) EMI fingerprint in the database library. This make/model/configuration scanned from the target utility device can then be added to the reference (GS) EMI fingerprints for that make and model in the database library. Ordinarily, this situation is not expected—utility device rollout procedures include uploading a reference (GS) EMI fingerprint to the database library for each new component configuration introduced. Therefore, it is much more likely that a Red Light Alarm signifies a security concern. But it is convenient that this system also enables ready correction of any failure to include a reference (GS) EMI fingerprint in the database library. Further, if there is a process or business failure and an allowable configuration does not get into the latest update to the database library of reference (GS) EMI fingerprints, it will be caught during this step.]

—Signal Alignment for EMI Fingerprint Comparison—

Figure 7:
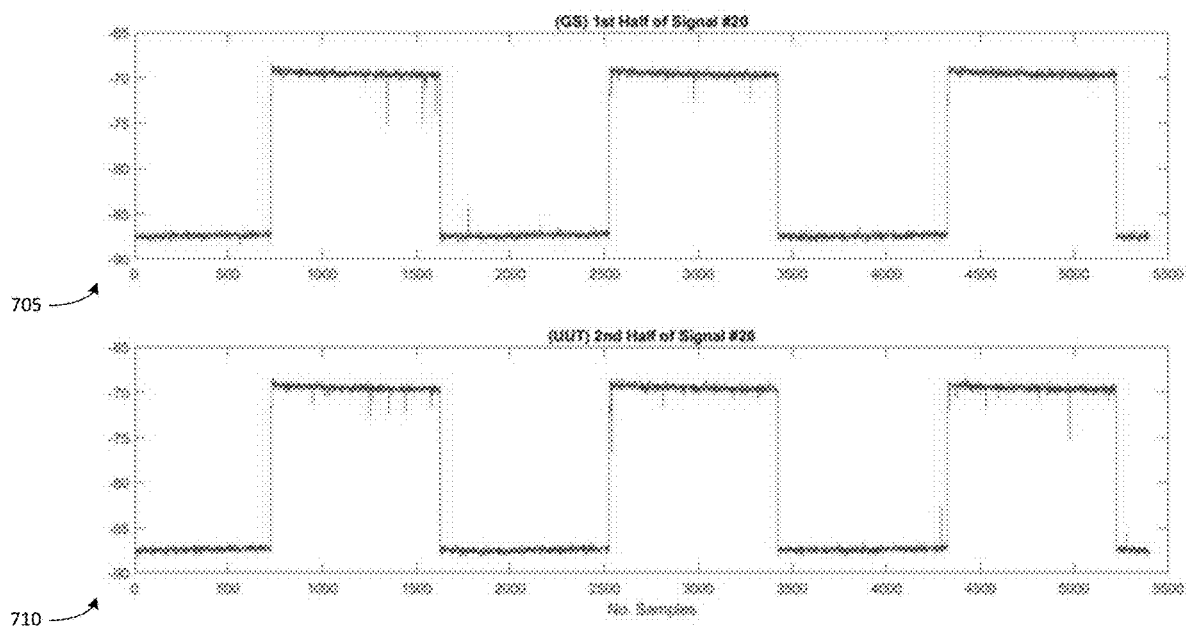
FIG. 7 illustrates reference waveform ("Golden System" or "GS"), alongside target waveform ("Unit Under Test" or "UUT."), for one example of distinguishing target EMI Fingerprint using the EMI Fingerprint of a corresponding GS.

When comparing a target EMI fingerprint to a reference EMI fingerprint, the signals being compared should be pre-processed (e.g., cleaned) and aligned to avoid false positive detection of possible counterfeit utility devices. FIG. 7 shows reference waveform ("Golden System" or "GS") (top), 705, alongside target waveform ("Unit Under Test" or "UUT.") (bottom), 710 for one example signature frequency of the EMI Fingerprint. The reference waveform 705 and target waveform 710 are shown here for comparison prior to any signal cleaning process and alignment. The values on the x-axis of the waveform plots are given in number of samples taken of the EMI signals, and the values on the y-axis are given in decibel-milliwatts (dBm). Sampling rate is consistent between the reference EMI fingerprint and the target EMI fingerprint. The approximate square-wave pattern of the power signals plotted in FIG. 7 is due to the on/off, energize/de-energize, high-power/low (no) power operation of the reference and target utility devices in accordance with the test sequence.

Figure 8:
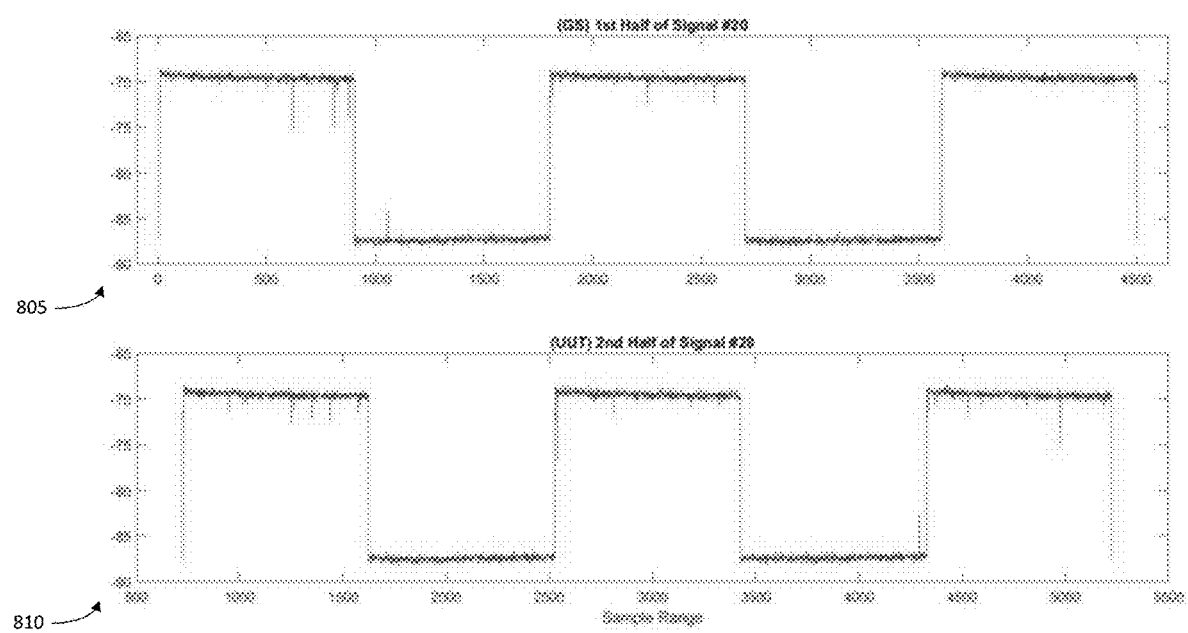
FIG. 8 illustrates the same EMI fingerprint signature frequency in both the reference EMI fingerprint and target EMI fingerprint after automated edge detection is applied to trim signal vectors to an optimal length.

In one embodiment, signal quality and alignment is improved by trimming target signals to an optimal length. FIG. 8 illustrates the same EMI fingerprint signature frequency in both the reference EMI fingerprint and target EMI fingerprint after automated edge detection is applied to trim signal vectors to an optimal length that begins and ends with major transitions in amplitude at the fingerprint signature. This trimming effects a coarse alignment of the reference and target signals. The alignment prevents undesirable spikes in residuals between the EMI fingerprints near the transitions between higher amplitude and lower amplitude states. Note that the reference (GS) signal (top), 805, is out of phase with the target (UUT) signal (bottom), 810. The phase shift is visible upon inspecting the sample point domains (along the x-axis) for both signals. This out of phase alignment is unavoidable because the scans are manually triggered by a human scanning the target utility devices. Thus, in one embodiment, the system trims (i) the target (collected) EMI signals to an optimal length for comparison with one or more of the reference EMI fingerprints, (ii) the reference EMI signals to an optimal length for comparison with the target (collected) EMI signals, or (iii) trims both the target (collected) EMI signals and the reference EMI fingerprints to an optimal length for comparison with one another.

Figure 9:
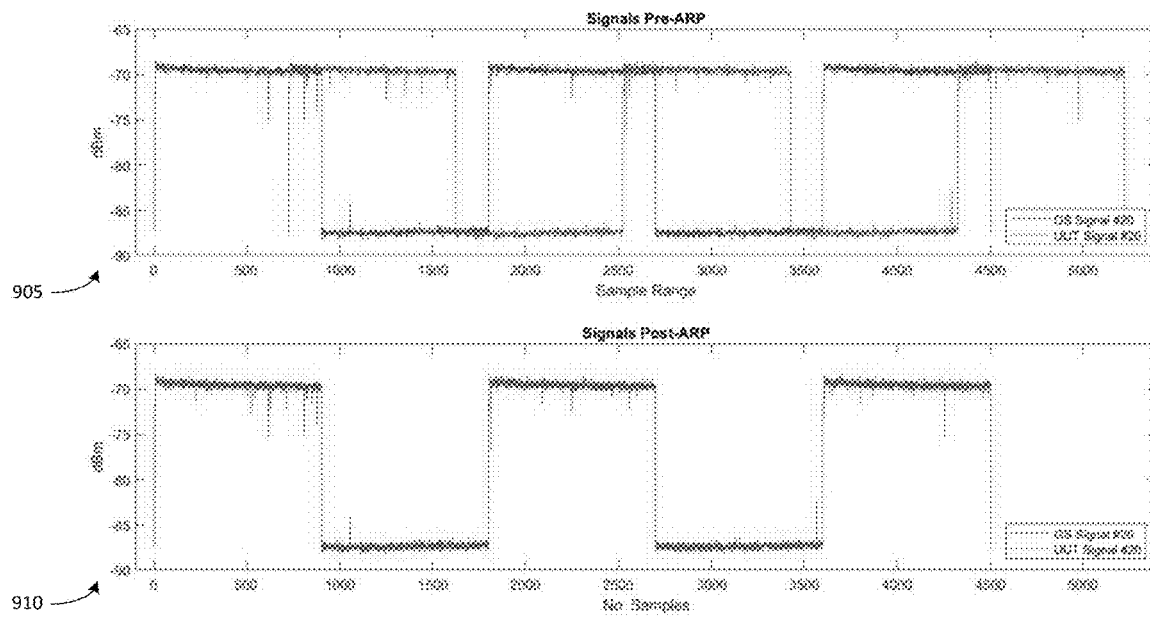
FIG. 9 illustrates the effects of optimal synchronization using an analytical resampling process on the reference (GS) signal and target (UUT) signal.

In one embodiment, phase alignment is further improved, and the phase shift is corrected, by applying a phase shift synchronization such as OracleLab's Analytical Resampling Process (ARP). FIG. 9 illustrates the effects of optimal synchronization using ARP on the reference (GS) signal and target (UUT) signal. The original reference (GS) and target (UUT) signals are shown plotted in the same axis (top) 905 to illustrate how severely misaligned the two signals are. The reference (GS) and target (UUT) signals are also shown plotted in the same axis (bottom) 910 after ARP is applied, showing how the two signals are indeed synchronous. The binned timeseries EMI signals of the reference (GS) utility device and the target (UUT) are thus optimally synchronized by ARP. Thus, in one embodiment, the system synchronizes a first phase of the target (collected) EMI signals with a second phase of one of the reference EMI fingerprints.

Recall that each signature frequency is one of the top-N frequency bins that have the highest signal-to-noise ratio, selected to be included in the EMI fingerprint as most informative. In one embodiment, N=20 bins are selected to represent the 3D EMI Fingerprint for each system. The framework is nevertheless flexible and extensible to any larger or smaller number of bins. N=20 bins works well in practice. The signal cleaning and alignment process, including trimming signal vectors described with reference to FIG. 8 and phase shift synchronization described with reference to FIG. 9 will be repeated in an iterative loop for all N signature frequencies (top frequency bins) of the EMI fingerprint. Each pair of reference (GS) and target (UUT) signals for a signature frequency will be trimmed and phase shifted to ensure more accurate comparison of the reference and target EMI fingerprints.

—EMI Fingerprint Surface Mean Absolute Error—Similarity Metric—

An autonomous similarity metric or "likeness" metric called EMI fingerprint surface mean absolute error (EMIF SAME or SMAE) is introduced herein to quickly infer the unknown configuration of the target utility device. In one embodiment, the similarity metric described with reference to method 300 is an EMI fingerprint surface mean absolute error. The SMAE, and its component mean absolute error (MAE) is a quantitative numerical metric for 3D surface differentiation. The SMAE enables automated and empirical selection of the exact authentic configuration of the target utility device being scanned, with no required interaction/distraction for the users of the system.

Human visual comparison between two 3D EMI fingerprint surfaces yields only a qualitative comparison of the similarity. This qualitative comparison is an inconsistent indicator of whether the reference (GS) utility device and target (UUT) are like-like configurations, or like-dislike configurations. Further, the human visual comparison doesn't scale—a human has no ability to handle a growing amount of work by adding resources to the system. We introduce here a quantitative metric, called the Mean Absolute Error (MAE) that is applied to the individual signals of the after the trimming and phase shift synchronization discussed above, and then a Surface MAE (SMAE) that is a sum across the 3D surface of the EMI fingerprint for all N signature frequencies that are picked to represent the asset "Fingerprint."

In one embodiment, the similarity metric is based on mean absolute error at a set of specific frequencies between the reference EMI fingerprint and the target EMI fingerprint.

Mean absolute error MAE between a reference signal and a target signal at a signature frequency may be expressed by the following formula, $$MAE = \frac{\sum_{i=1}^{M} |y_i - x_i|}{M} \quad (\text{Eq. 1})$$

where M is the total number of amplitude-time pairs that make up the amplitude-time series for the signature frequency (the length of the target signals), i is the index, and y is the value of the reference signal at index i, and x is the value of the target signal at index i.

Surface mean absolute error SMAE over each of the signature frequencies for a fingerprint may be expressed by the following formula, $$SMAE = \Sigma_{j=1}^{N} MAE_j \quad (\text{Eq. 2})$$

where N is the total number of signature frequencies in the EMI fingerprint, and j is the index. Thus, the entire square wave time series for the target (UUT) EMI fingerprint is subtracted from the entire square wave time series for the reference (GS) EMI fingerprint to compute the Surface MAE.

Figure 10:
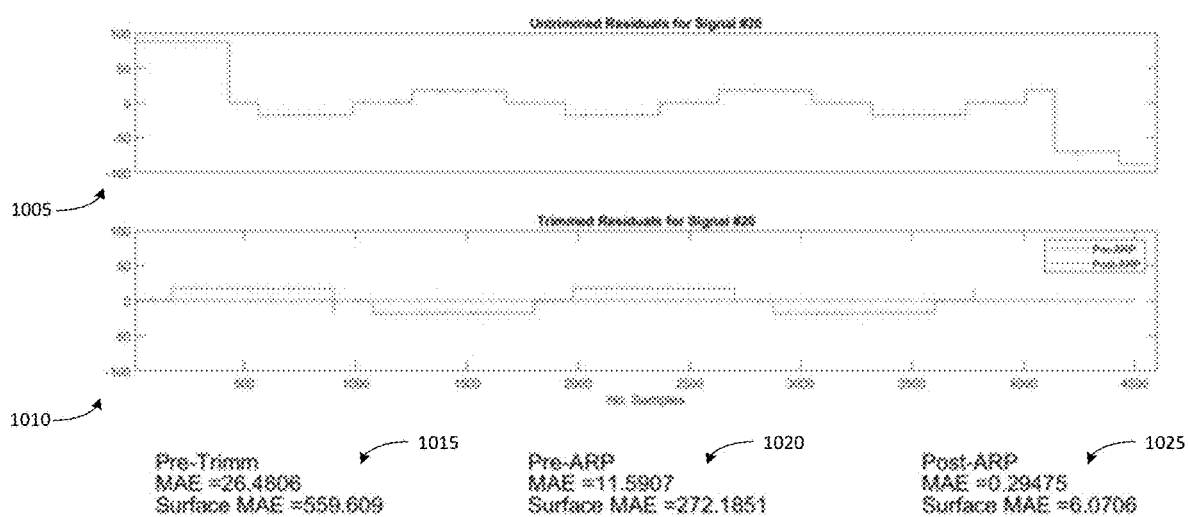
FIG. 10 shows example EMI residuals using untrimmed and trimmed EMI signals for an example raw signal to contrast the signal comparison metrics.

FIG. 10 shows example untrimmed residuals 1005 and trimmed residuals 1010 for an example raw signal to contrast the signal comparison metrics. The residuals (top) between the reference (GS) and target (UUT) EMI signals, before ARP synchronization is applied and after ARP synchronization is applied, are a metric used to determine the correlation between signals. The MAE is a scalar representation of the residuals for the individual time series signals, and the SMAE is a scalar value used to determine the accumulative correlation between groups of signals (bottom). As can be inferred from the figure the phase difference can falsely indicate a difference between signals, ARP substantially improves all of the individual-signal MAE metrics and now correctly identifies the similarity between 3D EMIF in the pairwise comparisons for all permutations of the reference (GS) and target (UUT) EMI signals.

The bin residual and surface residual are characterized by MAE and SMAE before and after Trimming operations and ARP Optimized Synchronization. Note that the original, pre-trimming SMAE 1015 is large, nearly 560. Trimming the signals reduces the SMAE to 272 as shown at Pre-ARP characterization 1020. The final optimized similarity metric 1025 shows an SMAE of only 6. The improvements reduce the raw SMAE from 560 to 6 for this example data. This gives an indication of the size of the threshold which may be set for comparison between target EMI fingerprints and reference EMI fingerprints.

—Example Automated Make-Model Configuration Discovery for Counterfeit Detection—

In one embodiment, the similarity metric is generated by for each specific frequency in the reference EMI fingerprint, generating a residual between a reference amplitude-time series signal at the specific frequency in the reference EMI fingerprint and a MSET estimate of a target amplitude-time series signal at the specific frequency in the target EMI fingerprint; and combining the generated residuals to generate the similarity metric.

Figure 11A:
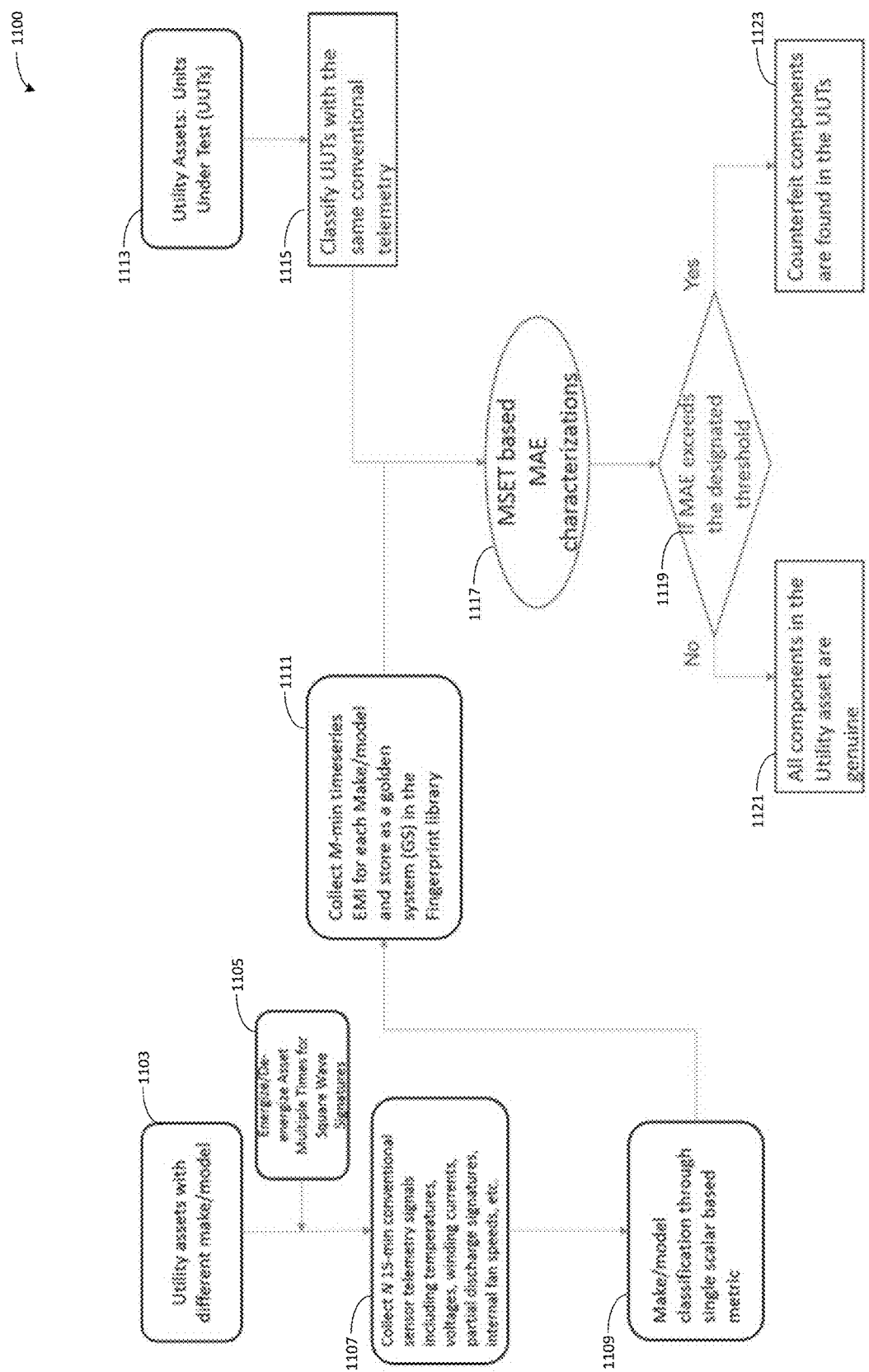
FIG. 11(a) illustrates one embodiment of a schematic and procedures for an automated Make-Model configuration discovery for counterfeit detection technique.
Figure 11B:
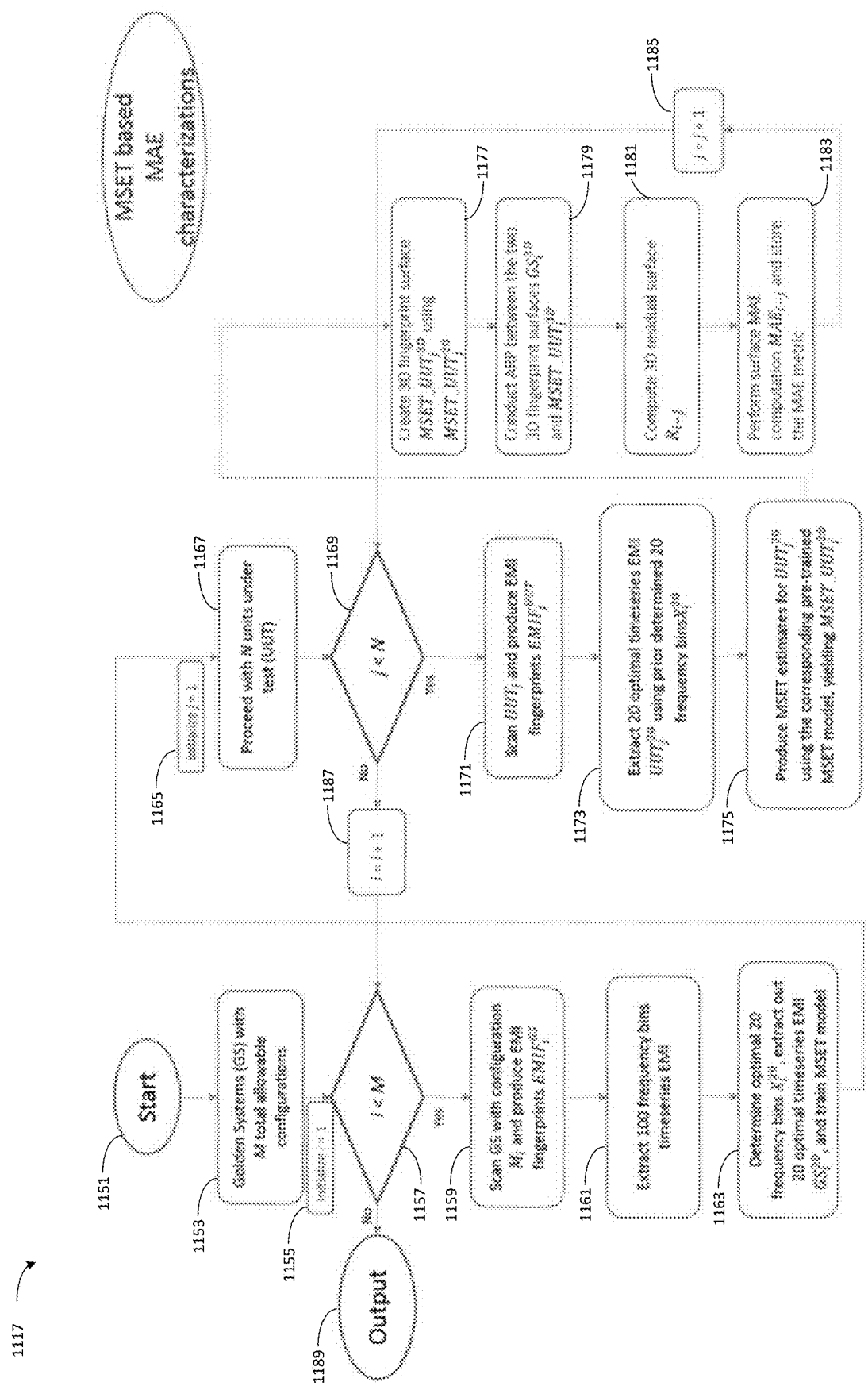
FIG. 11(b) illustrates one embodiment of a method for making MSET based MAE characterizations.

FIG. 11(a) illustrates one embodiment of a schematic and procedures 1100 for an automated Make-Model configuration discovery for counterfeit detection technique. FIG. 11(b) illustrates one embodiment of a method for making MSET based MAE characterizations. The modules in FIGS. 11(a) and (b) are further described in the numbered steps below.

1. Energize/De-energize utility assets (also referred to herein as "utility devices" with different variants for square wave signatures, from which N 15-min conventional sensor telemetry signals can be collected. (1103, 1105, and 1107).
2. Classify Utility asset makes/models through any single scalar-based metric (e.g. MAE). (1109).
3. The classified system with M configurations are analyzed by performing scope scans, yielding M EMI fingerprints, stored in a reference (GS) EMI fingerprint Library. To reduce the Signal to Noise Ratio (SNR), the fine-grain RF frequencies (4000 fine-bin frequencies in the preferred embodiment) comprising each EMIF are further subgrouped into 100 coarse-frequency bins. (1111, 1151-1161).
4. The 20 best frequency bins are determined from the 100 bins, whose timeseries EMI contents exhibit prominent periodicity in the frequency domains. The prominent periodicity reflects the load dynamics on the target utility asset (UUT). In one embodiment, the 20 best frequency bins are the These reference frequency bins are immutable and unchanging during the subsequent residual operations. (1163).
5. The target utility asset (UUT) is also classified with conventional telemetry and subsequently analyzed with scope scans, (1113, 1115) fine frequency bins are again coalesced into 100 coarse frequency bins, and then the same 20 best frequencies that are prior determined for the reference (GS) are used on every target utility asset (UUT) scanned. (1111, 1151-1161). The pre-stored GS Library of configurations EMIFs that correspond to the Make/Model of UUT is retrieved from the database library.
6. The M reference (GS) and N target (UUT) EMI fingerprints are paired through a permutation operation that systematically considers all possible reference-target (GS-UUT) pairs. Then a MSET model is built by training the 20 frequency bins for reference $GS_i$, (1163), and then the MSET estimates are produced for 20 frequency bins for target $UUT_j$, yielding MSET-UUT (1175).
7. The 20 frequency bins for both $GS_i$ and MSET-UUT are merged again correspondingly to yield two temporal synchronized EMI surfaces (1177).
8. The two EMI surfaces are processed with 2D-Surface-Subtraction operation, which yields a 2D noisy residual surface in 3D space (1181) (visualization examples below), and the MAE is calculated from the residual surface and recorded (1183).
9. Step 6-8 are parametrically iterated over all possible pairs of the $GS_i$ and $UUT_j$ EMIFs. (1157-1189 defining the loops).
10. The pairs of reference (GS) and target (UUT) with high MAE value suggests the two systems are different (illustrated in FIG. 12), while the pair with low MAE value indicates they are identical (illustrated in FIG. 13).

Figure 12:
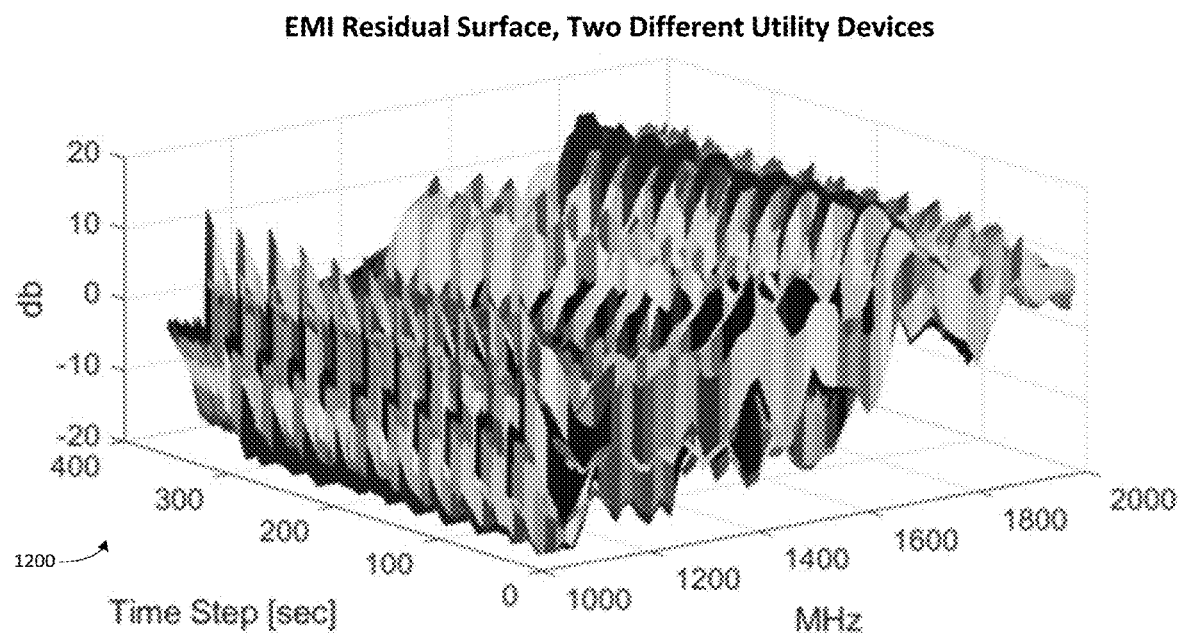
FIG. 12 illustrates an example 3D EMI residual surface generated by comparison of two different utility devices.

FIG. 12 illustrates an example 3D EMI residual surface 1200 generated by comparison of two different utility devices. Subtraction and merge operations between the EMI fingerprints for the two different utility devices are performed on the temporally synchronized 20 frequency bins, yielding a residual surface with high variability. A MAE or SMAE calculated from this surface will be high.

Figure 13:
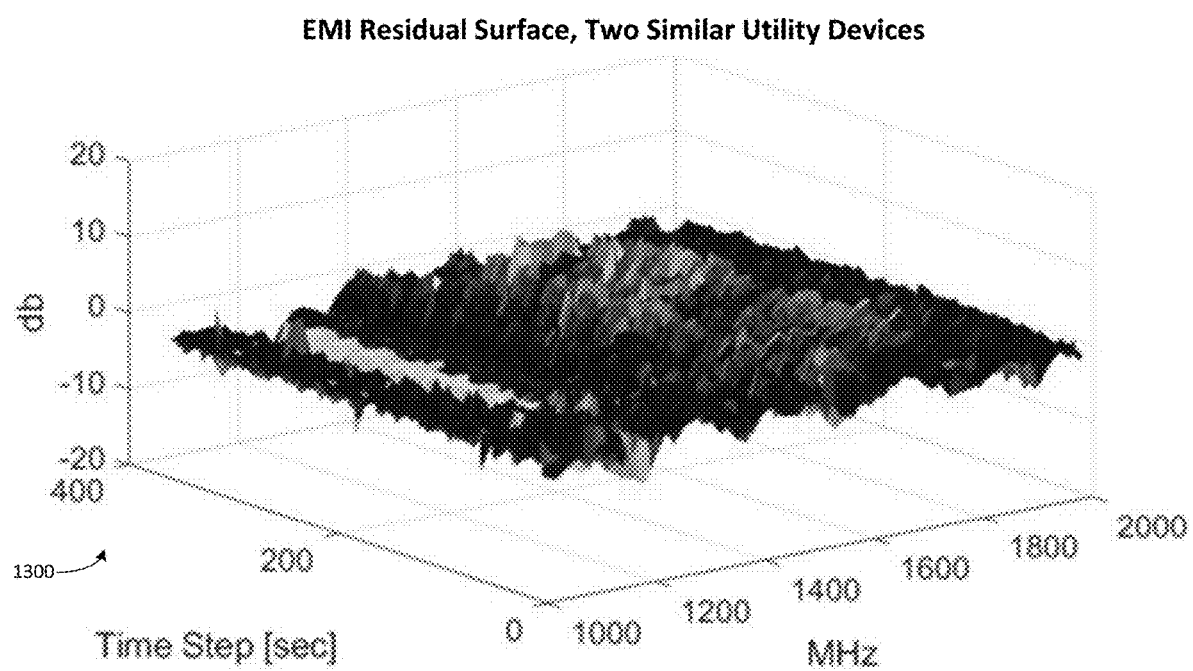
FIG. 13 illustrates an example 3D EMI residual surface generated by comparison of two similar (or identical) utility devices.

FIG. 13 illustrates an example 3D EMI residual surface 1300 generated by comparison of two similar (or identical) utility devices. Subtraction, merge, and synchronization operations between the EMI fingerprints for the two identical (or similar) utility devices are performed on the temporally synchronized 20 frequency bins on a bin-by-bin basis, and then aggregated across the surface, yielding a substantially flattened residual surface with low variability. A MAE or SMAE calculated from this surface will be low.

Figure 14:
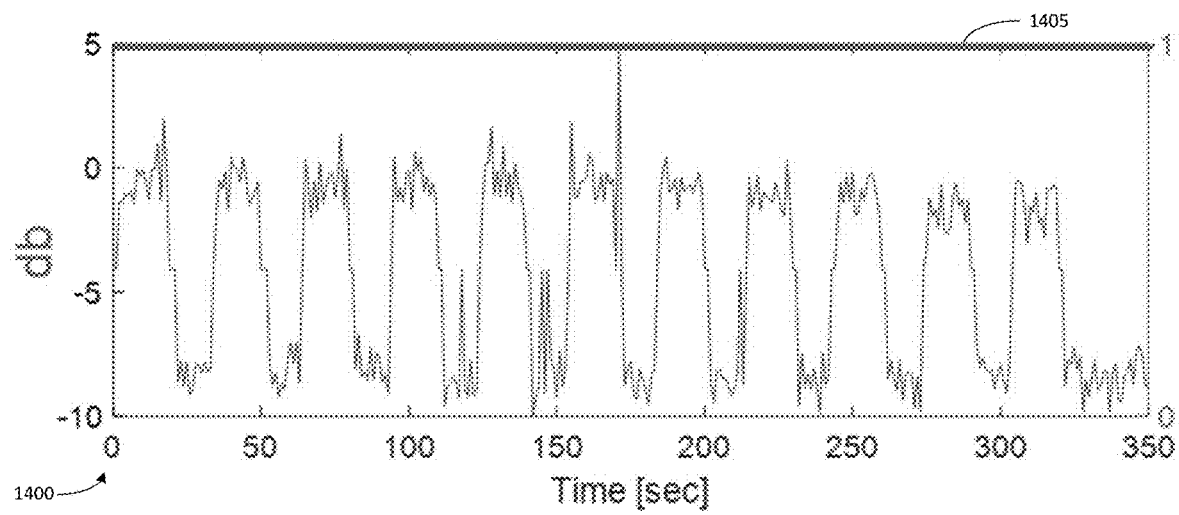
FIG. 14 illustrates an example EMI residual between two different utility devices across one of the frequency bins, which triggers MSET alarms.

FIG. 14 illustrates an example EMI signal residual 1400 between two different utility devices across one of the 20 frequency bins that make up 3D EMI residual surface 1200. In one embodiment, any anomaly in the residual vs the corresponding GS frequency binned time series is found and identified by MSET. MSET anomaly alerts are shown by dots that all have logical value 1 (see right y-scale), indicating anomaly alerts for this residual. EMI signal residual 1400 is identified by MSET to be in a constantly anomalous state, as shown by the continuous line of dots 1405 at logical value 1.

For signals with no anomalies vs the corresponding GS frequency binned time series, there are no anomalies (logical value 0) for the MSET results.

Figure 15:
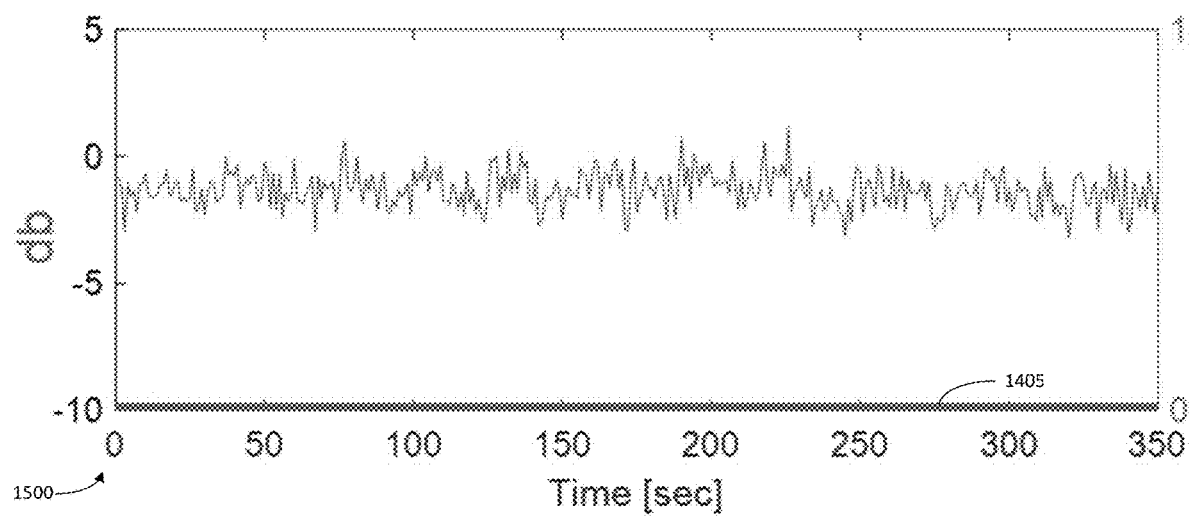
FIG. 15 illustrates an example EMI residual between two similar (or identical) utility devices across one of the frequency bins, which does not trigger MSET alarms.

FIG. 15 illustrates an example EMI signal residual 1500 between two similar (or identical) utility devices across one of the 20 frequency bins that make up 3D EMI residual surface 1300. No obvious anomaly in the 3D residual surface is visually found. This is confirmed by MSET—the absence of anomaly alerts is shown by dots that all have logical value 0 (see right y-scale). EMI signal residual 1500 is identified by MSET to be constantly in a non-anomalous (or conforming) state, as shown by the continuous line of dots at logical value 0.

—Graphical User Interface—

Figure 16:
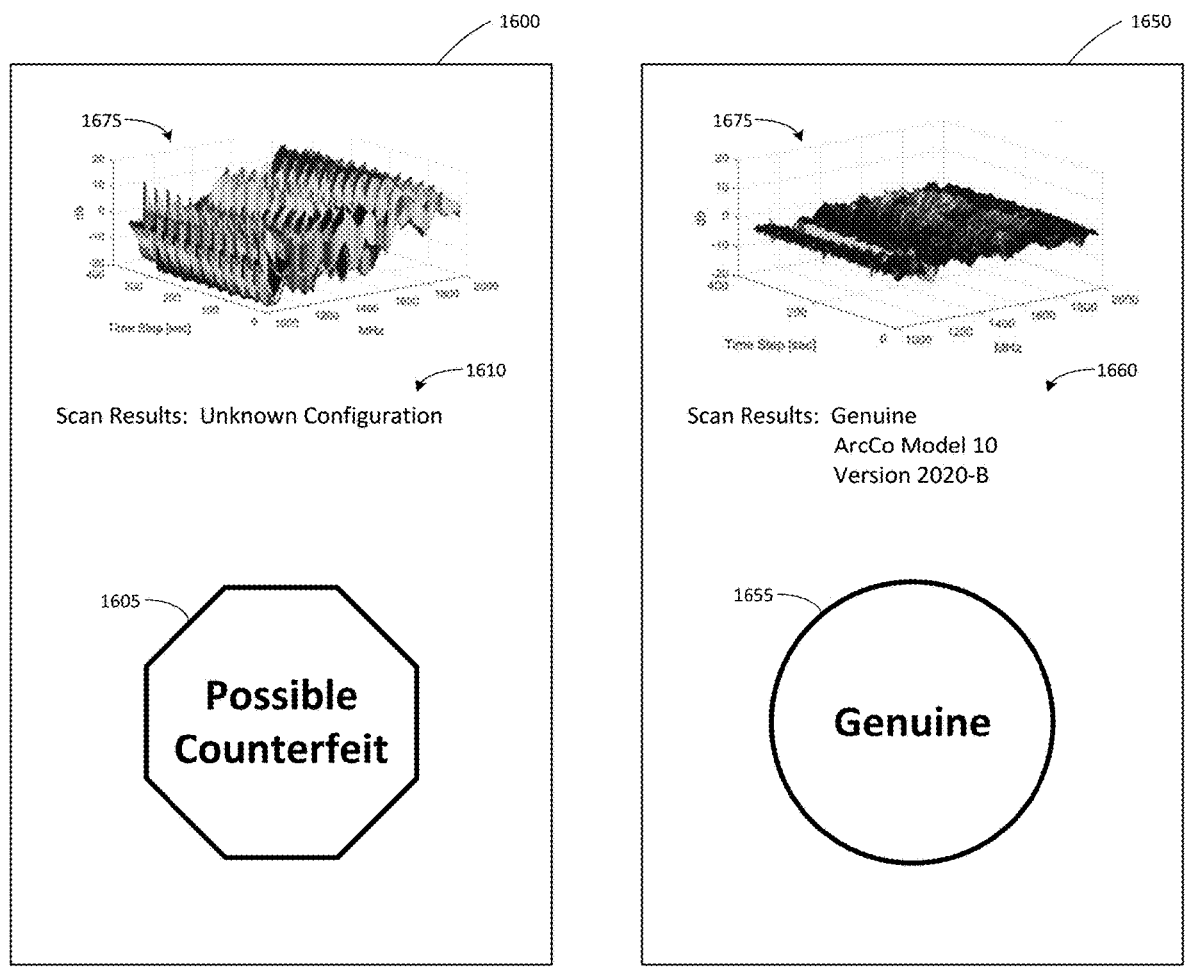
FIG. 16 illustrates two views of an embodiment of a graphical user interface for use with display of EMI fingerprint counterfeit scanner to visually present the results of an EMI fingerprint scan of a target utility device.

FIG. 16 illustrates two views of an embodiment of a graphical user interface for use with display 165 of EMI fingerprint counterfeit scanner 100 to visually present the results of an EMI fingerprint scan of a target utility device.

In one embodiment, "Fail" view 1600 may be displayed when the signal regarding the results indicates that the target utility device is not a known valid configuration. In one embodiment, "Fail" view 1600 includes a large visual indicator 1605, which may be colored red and octagonal, indicating that the target device is a suspected counterfeit (containing at least one counterfeit component). In one embodiment, "Fail" view 1600 may also include a summary of scan results 1610.

In one embodiment, "Success" view 1650 may be displayed when the signal regarding the results indicates that the target utility device is a known valid configuration. In one embodiment, "Success" view 1650 includes a large visual indicator 1655, which may be colored green and circular indicating that the target device is a genuine device. In one embodiment, "Success" view 1650 may also include a summary of scan results 1610, which may include the make, model, and configuration numbers or vintage information of the target utility device.

In one embodiment, the system further generates and displays a visualization 1675 on the graphical user interface of a 3D residual surface based on one of the reference EMI fingerprints and the target EMI fingerprint. In another embodiment, visualizations of any type, including those described with reference to FIGS. 12-15 may be presented on the graphical user interface. This may provide further information to the user as to why the target device was confirmed genuine or failed to be confirmed.

Cloud or Enterprise Embodiments

In one embodiment, portions of the database library and/other systems shown and described herein are a computing/data processing system including a database application or collection of distributed database applications. The applications and data processing system may be configured to operate with or be implemented as a cloud-based networking system, a software-as-a-service (SaaS) architecture, a platform-as-a-service (PaaS) architecture, an infrastructure-as-a-service (IaaS) architecture, or other type of networked computing solution. In one embodiment the cloud computing system is a server-side system that provides one or more of the functions disclosed herein and that is accessible by many users through EMI fingerprint counterfeit scanner 100 or other client computing devices communicating with the cloud computing system (functioning as the server) over a computer network.

Computing Device Embodiment

Figure 17:
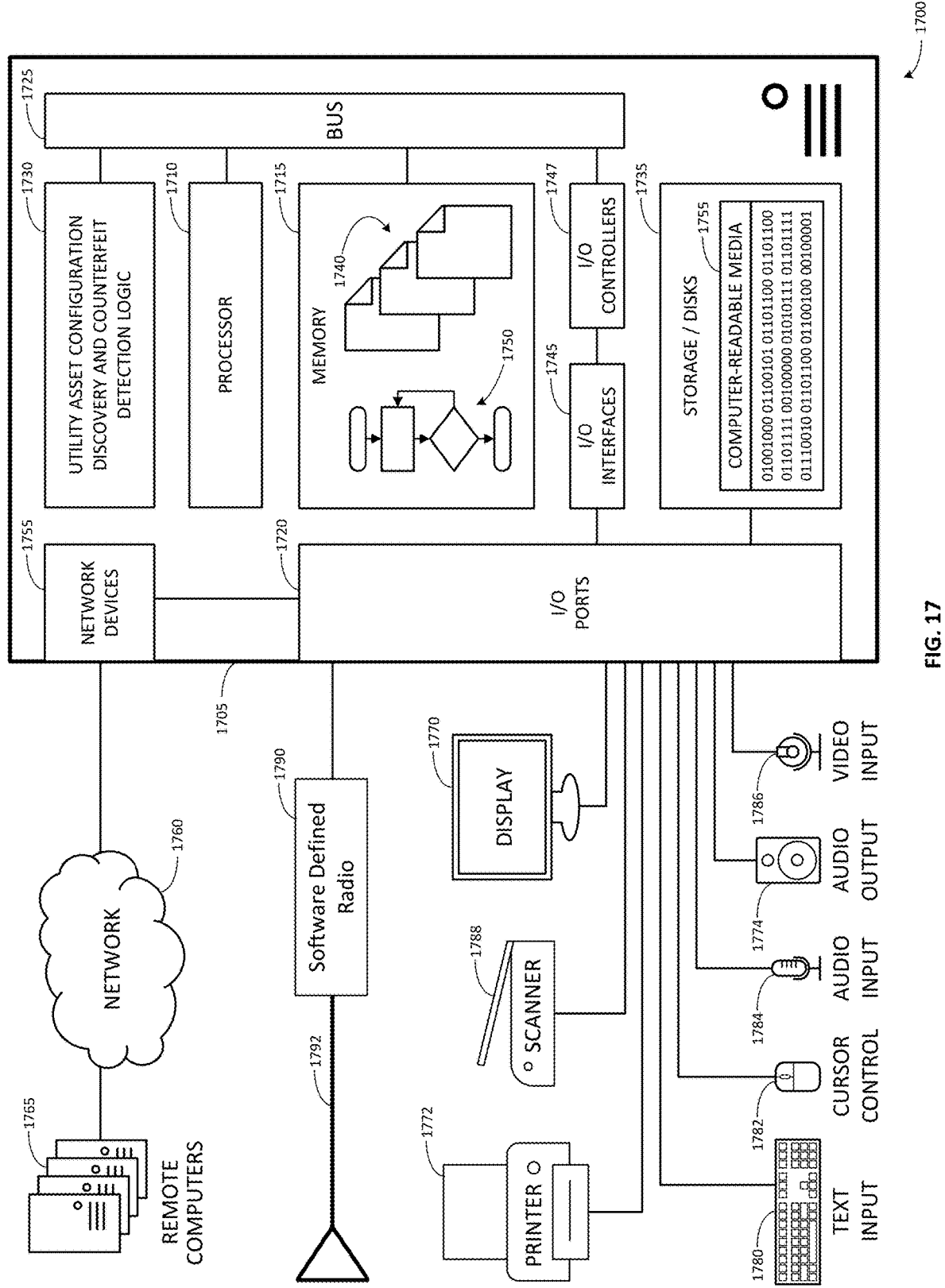
FIG. 17 illustrates an embodiment of a computing system configured with the example systems, methods, and/or special purpose equipment disclosed herein.

FIG. 17 illustrates an example computing device 1700 that is configured and/or programmed with one or more of the example systems and methods described herein, and/or equivalents. The example computing device may be a computer 1705 that includes a processor 1710, a memory 1715, and input/output ports 1720 operably connected by a bus 1725. In one example, the computer 1705 may include utility asset configuration discovery and counterfeit detection logic 1730 configured to facilitate utility asset configuration discovery and counterfeit detection similar to logic and systems shown in FIGS. 1 through 16. In different examples, the logic 1730 may be implemented in hardware, a non-transitory computer-readable medium with stored instructions, firmware, and/or combinations thereof. While the logic 1730 is illustrated as a hardware component attached to the bus 1725, it is to be appreciated that in other embodiments, the logic 1730 could be implemented in the processor 1710, stored in memory 1715, or stored in disk 1735.

In one embodiment, logic 1730 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed for utility asset configuration discovery and counterfeit detection. The means may also be implemented as stored computer executable instructions that are presented to computer 1705 as data 1740 that are temporarily stored in memory 1715 and then executed by processor 1710.

Logic 1730 may also provide means (e.g., hardware, non-transitory computer-readable medium that stores executable instructions, firmware) for performing utility asset configuration discovery and counterfeit detection.

Generally describing an example configuration of the computer 1705, the processor 1710 may be a variety of various processors including dual microprocessor and other multi-processor architectures. A memory 1715 may include volatile memory and/or non-volatile memory. Non-volatile memory may include, for example, ROM, PROM, and so on. Volatile memory may include, for example, RAM, SRAM, DRAM, and so on.

A storage disk 1735 may be operably connected to the computer 1700 via, for example, an input/output (I/O) interface (for example, card, device) 1745 and an input/output port 1720. The disk 1735 may be, for example, a magnetic disk drive, a solid-state disk drive, a floppy disk drive, a tape drive, a Zip drive, a flash memory card, a memory stick, and so on. Furthermore, the disk 1735 may be a CD-ROM drive, a CD-R drive, a CD-RW drive, a DVD ROM, and so on. The memory 1715 can store a process 1750 and/or a data 1740, for example. The disk 1735 and/or the memory 1715 can store an operating system that controls and allocates resources of the computer 1705.

The computer 1705 may interact with input/output (I/O) devices via the I/O interfaces 1745 and the input/output ports 1720. Input/output devices may be, for example, a keyboard 1780, a microphone 1784, a pointing and selection device 1782, cameras 1786, video cards, displays 1770, scanners 1788, printers 1772, speakers 1774, the disk 1735, the network devices 1755, and so on. The input/output ports 1720 may include, for example, serial ports, parallel ports, and USB ports. The input/output devices may include a software defined radio 1790 and associated antenna 1792.

The computer 1705 can operate in a network environment and thus may be connected to the network devices 1755 via the I/O interfaces 1745, and/or the I/O ports 1720. Through the network devices 1755, the computer 1705 may interact with a network 1760. Through the network 1760, the computer 1705 may be logically connected to remote computers 1765. Networks with which the computer 1705 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method for detecting whether a target device that includes a plurality of electronic components is genuine or suspected counterfeit, the method comprising:
   performing a test sequence of energizing and de-energizing the target device of a specific model and collecting electromagnetic interference (EMI) signals emitted by the target device during the energizing and the de-energizing;
   generating a target EMI fingerprint from the EMI signals collected during the energizing and the de-energizing of the target device;
   retrieving a plurality of reference EMI fingerprints from a database library, wherein each reference EMI fingerprint corresponds to a distinct configuration of electronic components of a genuine device of the specific model, and wherein each reference EMI fingerprint is generated from reference EMI signals collected during performance of an energizing and de-energizing sequence on the corresponding configuration of the genuine device;
   iteratively comparing the target EMI fingerprint to individual reference EMI fingerprints in the plurality of reference EMI fingerprints and generating a similarity metric between each compared set of the target EMI fingerprint and the individual reference EMI fingerprint; and
   generating a signal indicating that the target device (i) is genuine where the similarity metric for any individual reference EMI fingerprint satisfies a threshold test, and (ii) is suspected to be counterfeit where no similarity metric for any individual reference EMI fingerprint satisfies the threshold test.

2. The method of claim 1,
   wherein the collecting the EMI signals from the target device that are emitted during the energizing and the de-energizing includes collecting a first set of EMI signals while the target device is energized and collecting a second set of EMI signals while the target device is de-energized; and
   wherein the target EMI fingerprint is generated from a combination of the first set of EMI signals and the second set of EMI signals.

3. The method of claim 1, wherein the test sequence of energizing and de-energizing the target device includes multiple energizations or de-energizations.

4. The method of claim 1, further comprising:
   receiving telemetry signals from a sensor component of the target device;
   classifying the target device to be of the specific model based on the telemetry signals;
   wherein the retrieval of the plurality of reference EMI fingerprints from the database library is based on the classification of the target device.

5. The method of claim 1, further comprising generating the similarity metric by:
   for each specific frequency in the reference EMI fingerprint, generating a residual between a reference amplitude-time series signal at the specific frequency in the reference EMI fingerprint and a multivariate state estimation technique (MSET) estimate of a target amplitude-time series signal at the specific frequency in the target EMI fingerprint; and
   combining the generated residuals to generate the similarity metric.

6. The method of claim 1, wherein the similarity metric is based on mean absolute error at a set of specific frequencies between the reference EMI fingerprint and the target EMI fingerprint.

7. The method of claim 1, wherein the similarity metric is a surface mean absolute error.

8. The method of claim 1, further comprising trimming the EMI signals to an optimal length for comparison with one or more of the reference EMI fingerprints.

9. The method of claim 1, further comprising synchronizing a first phase of the EMI signals with a second phase of one of the reference EMI fingerprints.

10. The method of claim 1, further comprising:
    (i) where the signal indicates that the target device is genuine, displaying a visual indication on a graphical user interface that the target device is genuine, and (ii) where the signal indicates that the target device is suspected to be counterfeit, displaying a visual indication on a graphical user interface that the target device is suspicious or counterfeit.

11. The method of claim 1, wherein the signal indicates that the target device is genuine, further comprising displaying a description of a make, model, and component configuration on a graphical user interface.

12. The method of claim 1, further comprising generating and displaying a visualization on a graphical user interface of a 3D residual surface based on one of the reference EMI fingerprints and the target EMI fingerprint.

13. A non-transitory computer-readable medium storing computer-executable instructions that when executed by at least a processor of a computer cause the computer to:
- collect, using a software defined radio and antenna, electromagnetic interference (EMI) signals emitted by a target device of a specific model while the target device is energized and then de-energized in a repeatable test sequence;
- generate a target EMI fingerprint from the EMI signals collected while the target device was energized and the de-energized,
- retrieve a reference EMI fingerprint from a database library, wherein the reference EMI fingerprint corresponds to a distinct configuration of electronic components of a genuine device of the specific model, and wherein the reference EMI fingerprint is generated from reference EMI signals collected while the genuine device is energized and then de-energized in the repeatable test sequence;
- compare the target EMI fingerprint to the reference EMI fingerprint and generate a similarity metric between the target EMI fingerprint and the reference EMI fingerprint; and
- generate and display a visual indication on a graphical user interface that the target device is:
  - genuine where the similarity metric for the reference EMI fingerprint satisfies a threshold test, and
  - suspicious or counterfeit where the similarity metric for the reference EMI fingerprint does not satisfy the threshold test.

14. The non-transitory computer-readable medium of claim 13,
- wherein the collecting the EMI signals from the target device that are emitted during the energizing and the de-energizing includes collecting a first set of EMI signals while the target device is energized and collecting a second set of EMI signals while the target device is de-energized; and
- wherein the target EMI fingerprint is generated from a combination of the first set of EMI signals and the second set of EMI signals.

15. The non-transitory computer-readable medium of claim 13, wherein the test sequence of energizing and de-energizing the target device includes multiple energizations or de-energizations.

16. The non-transitory computer-readable medium of claim 13, further comprising instructions that when executed by at least the processor cause the computer to:
- receive telemetry signals from a sensor component of the target device;
- classify the target device to be of the specific model based on the telemetry signals;
- wherein the retrieval of the reference EMI fingerprint from the database library is based on the classification of the target device.

17. The non-transitory computer-readable medium of claim 13, further comprising instructions that when executed by at least the processor cause the computer to trim the EMI signals to an optimal length for comparison with the reference EMI fingerprint.

18. The non-transitory computer-readable medium of claim 13, further comprising instructions that when executed by at least the processor cause the computer to synchronize a first phase of the EMI signals with a second phase of the reference EMI fingerprint.

19. The non-transitory computer-readable medium of claim 13, wherein the similarity metric is a surface mean absolute error.

20. A system for detecting whether a target device of a specific model that includes a plurality of electronic components is genuine or suspected counterfeit, the system comprising:
- a test sequence generator configured to automatically control power to alternately energize and de-energize the target device in a repeatable test sequence;
- an EMI fingerprint counterfeit scanner configured to
  - (i) collect electromagnetic interference (EMI) signals emitted by the target device while the target device is energized and then de-energized,
  - (ii) generate a target EMI fingerprint from the EMI signals collected while the target device was energized and the de-energized,
  - (iii) retrieve a plurality of reference EMI fingerprints from a data store, wherein each reference EMI fingerprint corresponds to a genuine reference device of the specific model and further corresponds to a distinct configuration of electronic components for the genuine reference device of the specific model,
  - (iv) iteratively compare the target EMI fingerprint to individual reference EMI fingerprints in the plurality of reference EMI fingerprints and generate a similarity metric between each compared set of the target EMI fingerprint and the individual reference EMI fingerprint, and
  - (v) generate and display a visual indication on a graphical user interface that the target device is:
    - genuine where the similarity metric for any individual reference EMI fingerprint satisfies a threshold test, and
    - suspicious or counterfeit where no similarity metric for any individual reference EMI fingerprint satisfies the threshold test.

* * * * *